(12) United States Patent
Klassen

(10) Patent No.: US 10,132,392 B2
(45) Date of Patent: Nov. 20, 2018

(54) SPEED CHANGE DEVICE

(71) Applicant: Genesis Advanced Technology Inc., Langley (CA)

(72) Inventor: James B. Klassen, Langley (CA)

(73) Assignee: Genesis Advanced Technology Inc., Langley (CA)

( * ) Notice: Subject to any disclaimer, the term of this patent is extended or adjusted under 35 U.S.C. 154(b) by 588 days.

(21) Appl. No.: 14/403,942

(22) PCT Filed: May 24, 2013

(86) PCT No.: PCT/CA2013/050400
§ 371 (c)(1),
(2) Date: Nov. 25, 2014

(87) PCT Pub. No.: WO2013/173928
PCT Pub. Date: Nov. 28, 2013

(65) Prior Publication Data
US 2015/0119179 A1      Apr. 30, 2015

Related U.S. Application Data

(60) Provisional application No. 61/652,148, filed on May 25, 2012.

(51) Int. Cl.
*F16H 13/08*      (2006.01)
*F16C 33/28*      (2006.01)
(Continued)

(52) U.S. Cl.
CPC ............. *F16H 13/08* (2013.01); *F16C 19/38* (2013.01); *F16C 19/505* (2013.01); *F16C 33/36* (2013.01); *F16C 33/363* (2013.01); *F16C 33/523* (2013.01); *F16C 33/526* (2013.01); *F16C 33/585* (2013.01); *F16H 1/28* (2013.01)

(58) Field of Classification Search
None
See application file for complete search history.

(56) References Cited

U.S. PATENT DOCUMENTS 1,117,446 A      11/1914   Rodefeld
1,400,500 A      12/1921   Karl et al.
(Continued)

FOREIGN PATENT DOCUMENTS

GB      1 465 838         3/1977
JP      2001-141008 A     5/2001
(Continued)

OTHER PUBLICATIONS

Hewko, L.O., "Roller Traction Drive Unit for Extremely Quiet Power Transmission," Journal of Hydronautics 2(3):160-167, Jul. 1968 (1 page).

(Continued)

*Primary Examiner* — Colby M Hansen
(74) *Attorney, Agent, or Firm* — Christensen O'Connor Johnson Kindness, PLLC

(57) ABSTRACT

A speed change device comprising an inner race having an outer surface, an outer race having an inner surface, and set of orbital rollers including inner rollers in rolling contact with the outer surface of the inner race and outer rollers in rolling contact with the inner surface of the outer race.

35 Claims, 31 Drawing Sheets

(51) Int. Cl.
*F16C 33/36* (2006.01)
*F16C 19/38* (2006.01)
*F16C 19/50* (2006.01)
*F16C 33/52* (2006.01)
*F16H 1/28* (2006.01)
*F16C 33/58* (2006.01)

(56) References Cited

U.S. PATENT DOCUMENTS

| | | | |
|---|---|---|---|
| 1,737,695 A | 12/1929 | Zadow | |
| 3,254,546 A | 6/1966 | Nasvytis | |
| 3,330,171 A * | 7/1967 | Nasvytis | F16H 1/36 475/334 |
| 3,364,761 A * | 1/1968 | Nasvytis | F16H 13/14 475/195 |
| 3,365,254 A * | 1/1968 | Nasvytis | F16C 19/50 384/554 |
| 3,367,214 A | 2/1968 | Nasvytis | |
| 3,375,739 A | 4/1968 | Nasvytis | |
| 3,433,099 A * | 3/1969 | Nasvytis | F16H 13/06 475/183 |
| 4,224,840 A | 9/1980 | Kraus | |
| 5,122,099 A | 6/1992 | Boedo et al. | |
| 5,238,459 A | 8/1993 | Andre | |
| 7,018,316 B2 | 3/2006 | Ai | |
| 7,118,512 B2 | 10/2006 | Flugrad, Jr. et al. | |
| 7,513,692 B2 | 4/2009 | Bezyaiko | |
| 8,092,332 B2 | 1/2012 | Ai et al. | |
| 8,714,481 B2 | 5/2014 | Sweet et al. | |
| 9,567,069 B2 | 2/2017 | Cox | |
| 9,725,161 B2 | 8/2017 | Cox | |
| 9,725,163 B2 | 8/2017 | Edelson et al. | |
| 2009/0124447 A1 | 5/2009 | Marumoto | |
| 2012/0001018 A1 | 1/2012 | Gilleran et al. | |
| 2013/0062466 A1 | 3/2013 | Sweet et al. | |
| 2016/0025152 A1 | 1/2016 | Klassen et al. | |
| 2016/0122008 A1 | 5/2016 | Cox et al. | |

FOREIGN PATENT DOCUMENTS

| | | |
|---|---|---|
| JP | 2001-153202 A | 6/2001 |
| JP | 2001-193810 A | 7/2001 |
| JP | 2004-100927 A | 4/2004 |
| JP | 2011-102623 A | 5/2011 |
| NL | 1013027 C | 5/2001 |
| WO | 2006/137617 A1 | 12/2006 |
| WO | 2012/174306 A2 | 12/2012 |
| WO | 2013/173928 A1 | 11/2013 |
| WO | 2013/186635 A2 | 12/2013 |
| WO | 2014/105894 A2 | 7/2014 |

OTHER PUBLICATIONS

Rohn, D.A., et al., "Multiroller Traction Drive Speed Reducer: Evaluation for Automotive Gas Turbine Engine," NASA Technical Paper 2027, AVRADCOM Technical Report 81-C-11, Jun. 1982, 24 pages.

* cited by examiner

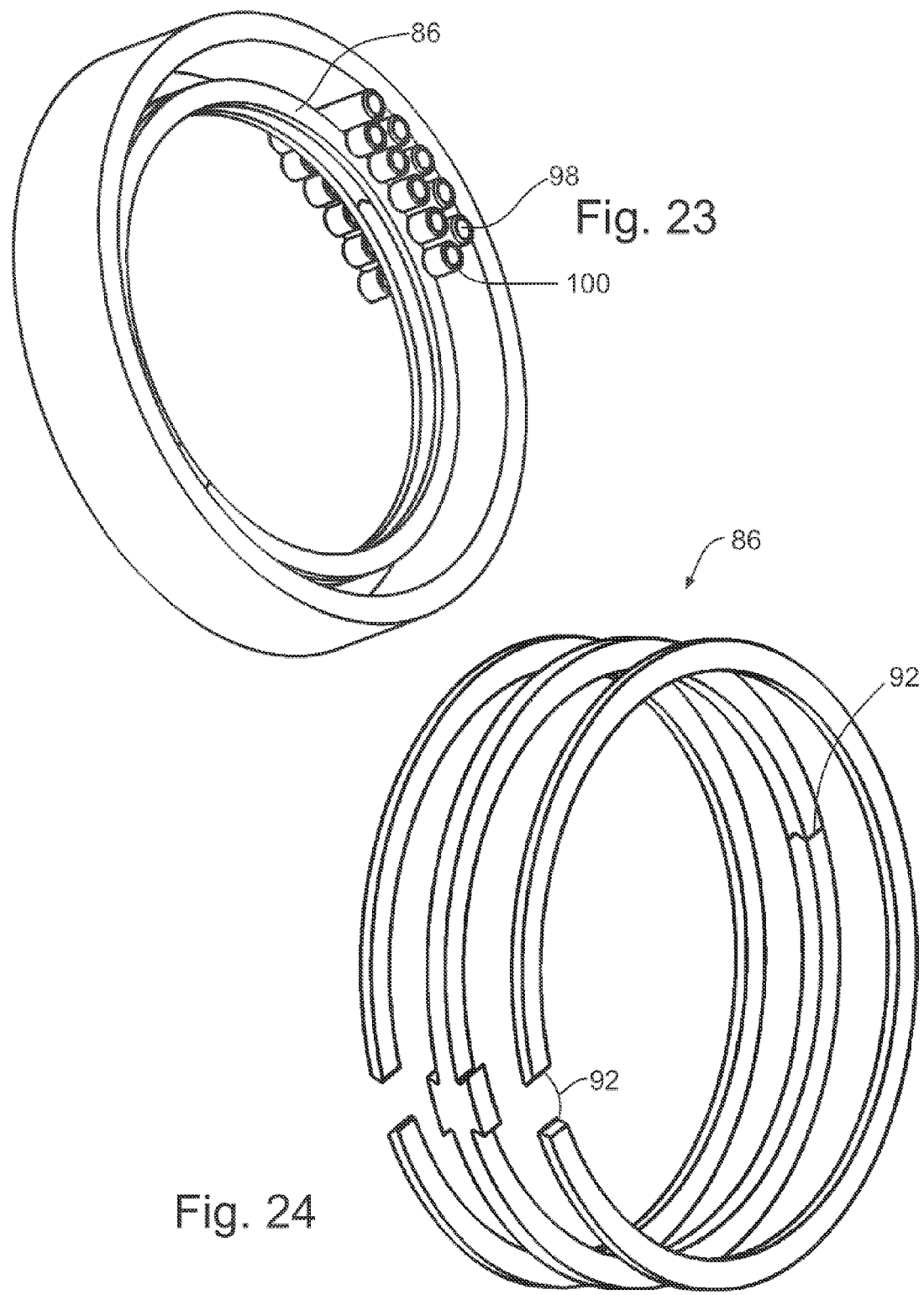

SPEED CHANGE DEVICE

CROSS-REFERENCE TO RELATED APPLICATIONS

This application claims the benefit under 35 DSC 119(e) of U.S. provisional application Ser. No. 61/652,148 filed May 25, 2012.

TECHNICAL FIELD

Speed-change devices.

BACKGROUND

Gear transmission speed change devices are capable of high torque but are complex to manufacture, exhibit backlash, gear noise, and typically require multiple stages to achieve high reduction ratios.

Traction drive speed change systems offer certain advantages but typically produce less torque then a geared speed change device of the same size.

Generally speaking, with traction drive systems it is desirable, for many applications, to provide pure rolling contact between torque transmitting members for low friction, high efficiency, long service life, and increased traction. Furthermore, is desirable for the contact forces between the torque transmitting members to increase automatically as torque increases, so high loads are only generated between traction components when necessary to allow increased torque output. This would provide the benefit of increased service life and efficiency by reducing wear surface loading when the actuator is not transmitting high torque.

Other desirable characteristics of a rotary actuator are zero backlash, backdriveability, low vibration, non-cogging output, high rigidity, and quiet operation. High torque capacity for size and weight are also desirable, as are a wide range of speed change ratio possibilities (including very high speed change ratios) high input speed capability (to allow the use of low torque input drive systems) low input inertia, and a relatively large center thru-hole for interned wiring (or possibly to allow an integrated electric w other type of rotary drive motor within (or partially within) the inner diameter (ID) of the actuator.

SUMMARY

There is disclosed a speed change device comprising an inner race having an outer surface, an outer race having an inner surface, and set of orbital rollers including inner rollers in rolling contact with the outer surface of the inner race and outer rollers in rolling contact with the inner surface of the outer race.

In an embodiment, each and every inner roller is in rolling contact with two outer rollers and each and every outer roller being in rolling contact with two inner rollers.

In an embodiment, a set of orbital rollers includes 19 or more inner rollers.

In an embodiment, each of the inner race and outer race are centered on an axis, and, for each pair of a first inner roller that contacts a first outer roller, where a traction angle ø is defined as the angle between a first line extending outward from the axis through a center of the first inner roller and a second line extending from the contact point of the first outer roller with the outer race and a contact point of the first inner roller with the inner race, and the first inner roller contacts the inner race with a first coefficient of friction cf1 and the first outer roller contacts the outer race with a second coefficient of friction cf2, cf1>tan (ø) and cf2>tan (ø).

In an embodiment, either A or B or both is present each inner roller is formed of two or more axially aligned roller sections, B each outer roller is formed of two or more axially aligned roller sections.

In an embodiment, at least each of the inner rollers or each of the outer rollers have two different diameters, and, depending on the ratio of the diameter or diameters of the inner rollers to the diameter or diameters of the outer rollers, the orbital rollers orbit in a direction the same as or opposite to rotation of the inner race.

In an embodiment, the orbital rollers extend between axial ends and the orbital rollers have decreasing diameter towards the axial ends.

In an embodiment, the rollers of the orbital rollers have conical faces that contact conical faces of other rollers of the orbital rollers when the rollers are not axially centered.

In an embodiment, a multiple stage speed change device is disclosed in which at least one of the stages comprises a speed change device according to one of the disclosed embodiments.

In an embodiment, at least some of the orbital rollers are spaced by one or more of a geared ring, a cage attached to at least some of the orbital rollers and cooperating circular and boss members on spaced apart orbital rollers.

Various of the embodiments, accomplish one or more of the desirable characteristics of a speed change device.

In various embodiments, there may be included any one or more of the following features one or more of the orbital rollers are hollow, inner or outer rollers or both are formed of axially aligned roller sections, the races are split, outer rollers or inner rollers are longer and the longer rollers are driven by a ring that is coaxial with the races, a drive or output ring as geared contact with either inner rollers or outer rollers, traction angles and/or friction coefficients have particular limits on their values, the rollers are pre-loaded, the inner race consists of a single cylindrical surface, the inner race consists of two or more cylindrical surfaces separated by an area large enough to allow room for other components, the outer race consists of a single cylindrical surface, the outer race comprises two or more cylindrical surfaces separated by an area large enough to allow room for other components, the inner and or outer races consists of two cylindrical surfaces on either side of a plane perpendicular to the axis of the races on or near a center position, measured axially from the outer edges of the cylindrical contact races of the inner and or outer races, a ring concentric with the inner race and outer race and the ring is connected to the orbital rollers is drive or be driven by the orbital rollers, the ring is connected to the inner rollers to drive the inner rollers, the ring has an inner surface and the inner surface is in contact with one or more inner rollers, the inner surface of the ring is in geared contact with one or more inner rollers, the inner surface of the ring is in traction contact with one or more inner rollers, the ring is connected to the outer rollers to drive the outer rollers, the ring has an outer surface and the outer surface of the ring is in contact with one or more outer rollers, which the outer surface of the ring is in geared contact with one or more outer rollers, the outer surface of the ring is in traction contact with one or more outer rollers, all rolling contacts are geared contacts, all rolling contacts are traction contacts, contacts of each inner roller with the inner race and with the outer rollers that transmit torque have a torque transmitting diameter and all the torque transmitting diameters are equal, contacts of each outer roller with the outer race and with the inner rollers that transmit torque have a torque transmitting diameter and all the torque transmitting diameters are equal, the outer rollers have a different diameter contact with the inner surface of the outer race, than the diameter of contact of the outer rollers with the inner rollers, the outer rollers have a larger diameter primary torque transmitting contact with the inner surface of the outer race, than the diameter in primary torque transmitting contact with the inner rollers, the outer rollers have a larger diameter primary torque transmitting contact with the primary torque transmitting contact inner surface of the outer race, than the primary torque transmitting contact diameter in contact with the inner rollers, and the inner rollers have the same primary torque transmitting contact diameter with the outer rollers as with the primary torque transmitting contact diameter of the inner race, the inner rollers have larger diameter primary torque transmitting contact with the outer rollers and smaller primary torque transmitting contact with the outer surface of the inner race, the outer rollers have two diameters and inner rollers have one diameter such that rotation of rollers causes orbiting of the rollers in one direction resulting in rotation of inner race in the same direction as roller orbit direction when the outer race is fixed, titer outer rollers have two diameters and the inner rollers have one diameter such that rotation of rollers causes orbiting of rollers in one direction resulting in rotation of the inner race in the opposite direction as the roller orbit direction when the outer race is fixed, the outer rollers have two diameters and inner rollers have two different diameters such that rotation of rollers causes orbiting of rollers in one direction resulting in rotation of inner race in the same direction as roller orbit direction when outer race is fixed, the outer rollers with two diameters and inner rollers with two different diameters such that rotation of the rollers causes orbiting of the rollers in one direction resulting in rotation of the inner race in the opposite direction as the roller orbit direction when outer race is fixed, the orbital rollers extend between axial ends and at least some of the orbital rollers have decreasing diameter towards at least one of the axial ends, the rollers of the orbital rollers have conical faces that contact conical faces of other rollers of the orbital rollers when the rollers are not axially centered, structural members are connected to one or both of the inner race and the outer race, the orbital rollers are configured to bear radial load, the inner race has a center through hole, a motor is integrated with the speed change device to provide an input drive, and other features listed in the claims or disclosure.

BRIEF DESCRIPTION OF THE FIGURES

Embodiments will now be described with reference to the figures, in which like reference characters denote like elements, by way of example, and in which;

FIG. 23 shows no example of a radially expanding input ring removed from the actuator.

FIG. 24 shows an alternative embodiment of the radially expanding input ring of FIG. 23.

DETAILED DESCRIPTION

The preferred embodiment of the present speed change device is believed to be capable of providing numerous of the desired benefits as well as others described in this disclosure. The Multi-Element Self Energizing Speed Change Device is, in many of its preferred embodiments, a torque reactive traction drive speed change device with a number of unique features and benefits.

With a high enough reduction ratio, low enough input friction, and a high enough input speed capability, it is believed to be possible to use a low torque, high speed drive input such as, but not limited to, a boundary layer air turbine or low torque electric motor such a compact inductance or variable reluctance electric motor.

Fluid (smooth, non-erratic) motion combined with precise control is a performance goal that very challenging with many conventional actuators. The use of art air turbine input with the present device is believed to allow for the precise control of actuated systems such as, but not limited to, robotic arm movements, with a very high level of precision and fluidity. A proportional air flow (or even a pulse width, modulated flow) valve controls the air flow to the turbine in either direction to produce rotatory motion.

By taking advantage of the potentially low friction (low resistance input rotation torque) and high speed input drive characteristic of the present device, it is believed by the inventor that the beginning and end of each actuator movement can be controlled precisely, while at the same raise allowing the natural acceleration and deceleration characteristics of the actuator to define, to a certain extent, what the acceleration and deceleration rates will be.

The traction version of the present device works on a dual idler roller torque transfer mechanism. The following description is a step by step description of the principle starting with a few prerequisite concepts.

Figure 1:
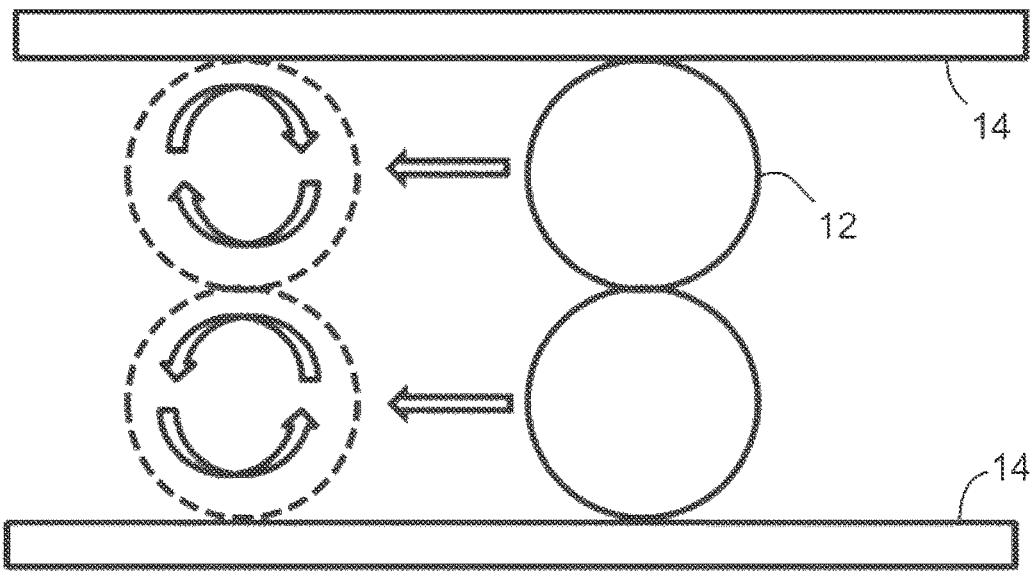
FIG. 1 shows a principle of operation of two equal, sized contacting rollers positioned vertically with parallel axes between two fixed horizontal contact surfaces.

Referring to FIG. 1, if two equal sized contacting rollers 12 are positioned vertically with parallel axes, between two fixed horizontal contact surfaces 14, they will both roll at the same speed and maintain their vertical alignment (assuming no slippage occurs). If one roller rotates, so must the other. If one roller is prevented from rotating, so will the other.

Figure 2:
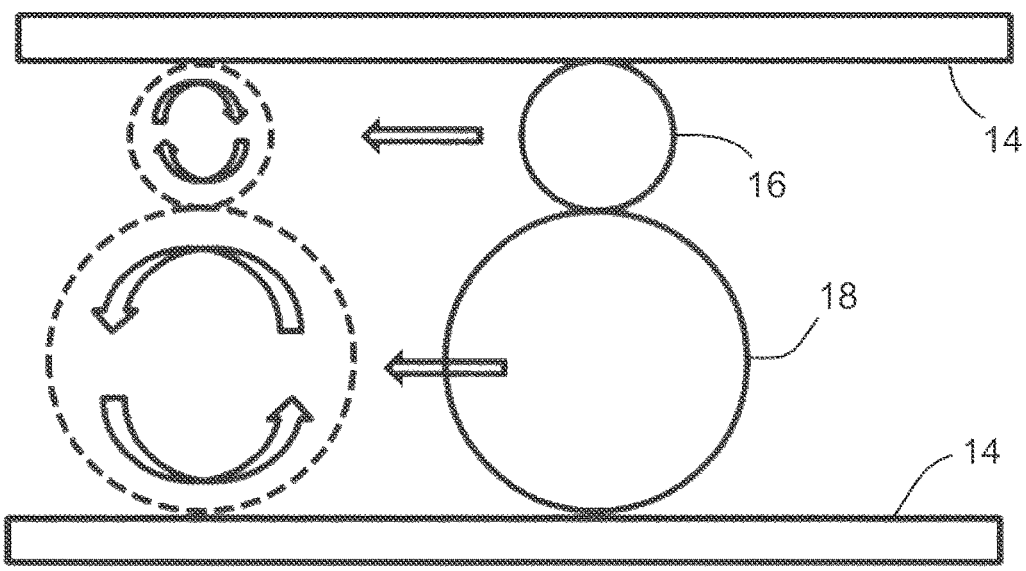
FIG. 2 shows an example where the contact rollers of FIG. 1 are of different sizes.

Referring to FIG. 2, according to this same principle, if one of the rollers 16 is smaller than the other roller 18, it will spin faster than the larger roller but will still maintain the vertical alignment provided no slippage occurs.

Figure 3:
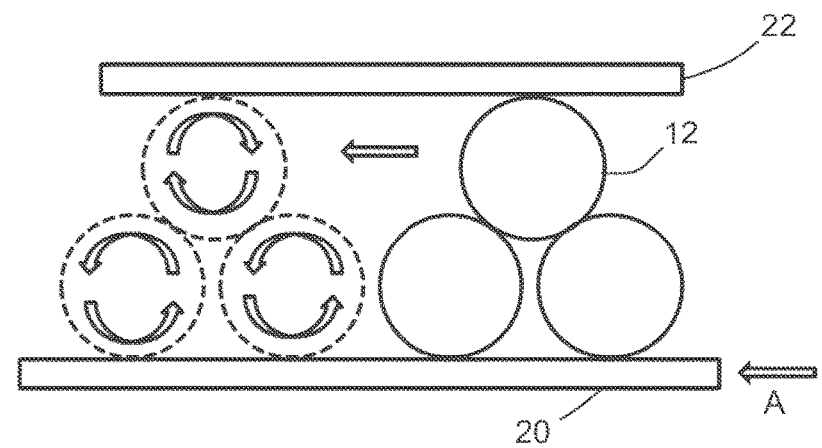
FIG. 3 shows three equal sized contact rollers positioned in a triangular stack between two fixed horizontal contact surfaces.

Referring to FIG. 3, if three rollers 12 are used in a triangular stack, the same principle holds true, but it becomes possible to transmit force through the rollers from one horizontal contact surface to the other. Rollers 12 can roll freely but races cannot move relative to each other without slipping. Force A may be applied to horizontally movable race 20. The force is transmitted through roller contacts to upper fixed or horizontally movable race 22.

In this case, the rollers can move relative to the horizontal surfaces, but (assuming a fixed distance between the horizontal surfaces) the horizontal surfaces are unable to move relative to each other without sliding on the rollers. Therefore, by applying a horizontal force to one horizontal surface (referred to here as a "race"), which is perpendicular to the roller axes, that force will be transmitted through the roller/race contacts with one race and roller/roller contacts to the other race through the other roller/race contact. Only two rollers are required to transmit force in one direction, as long as the angle of the two rollers is low enough, combined with a high enough coefficient of friction between the two rollers, and between the rollers and the races, to allow the camming action of the rollers to maintain a non-sliding traction contact at the surface contacts. If the coefficient of friction is too low, or if the angle of the rollers is too high, then force will only be transferred from one race to the other through the traction contact if the rollers are preloaded. In this diagram, preload would be accomplished by exerting a force on the bottom two rollers together, which will, in turn, push the single top roller upward and the bottom two rollers downward.

The fact that the rollers can roll freely while transmitting force from one race to the other, but at the same time, the races are not able to move relative to each other, may be counter-intuitive for some observers because we are accustomed to roller bearings allowing race contacts to roll freely against one another but while the surfaces of a roller bearing are allowed to roll freely in a roller bearing with a single row of rollers, the rollers themselves roll at a fixed ratio compared to the races (unless slippage occurs) and are therefore not free to move independently of the races.

By comparison, the dual rollers of the present device which are transmitting force from one horizontal surface to the other in FIG. 3 are able to roll freely at the same time as they are able to prevent movement of one race relative to the other.

Figure 4:
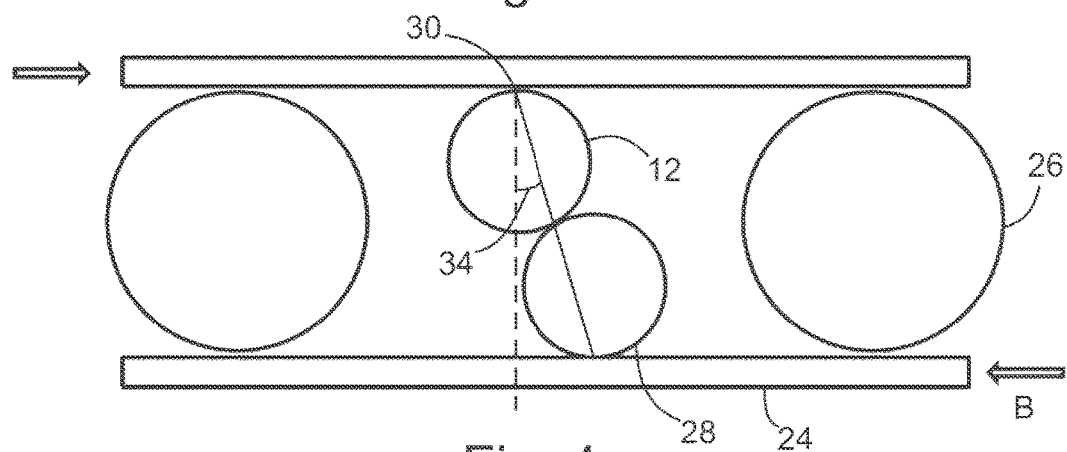
FIG. 4 shows two races spaced apart by two large cylindrical roller bearings between two fixed horizontal contact surfaces.

Referring to FIG. 4, another principle at work here is the self-energizing characteristic that results from the angled rollers "camming" against each other when force is applied thru them from one race to the other. This figure shows two races spaced apart by two large conventional cylindrical roller bearings 26. Only two force transmitting rollers 12 of the present device are used to illustrate force transfer in a single direction. In this case the large cylindrical rollers 26 set the distance between the races and a horizontal force B applied to the bottom race 24 is transmitted through the two smaller rollers 12 to the top race 32. The most significant characteristic demonstrated in this figure is how a horizontal force applied to the rollers will create a proportional vertical force on the races due to the traction angle 34 (from the broken vertical line) between contact 28 and contact 30.

This vertical "camming" force increases the contact force of the rollers on the races (and between the rollers) to prevent sliding at the traction contacts as the horizontal force between the races increases. This is true, even if there is very little vertical preload on the traction contacts rollers before the horizontal force is applied.

With coefficient of friction of 0.37 or greater, the traction angle of 20° shown here would allow force transfer from race to race in one direction without the preloading help of a third roller (as shown in FIG. 3). A metallic material with a coefficient of friction (CF) of up to 0.6 such as a boron infused steel such as boronizing surface treatment available from Richter Precision Inc. in East Petersburg, Pa., U.S.A. has a coefficient of friction of 0.4".

A typical beryllium copper will have a CF of up to 0.8 unlubricated against steel. An example of a plastic material with a CF of 0.4-0.5 is PC/PET. Certain grades of Torlon have a coefficient of friction of 0.35 and could be used with a traction angle of approximately 19° or less In FIG. 3, a third force transfer roller is used to allow horizontal force transmission between the racers in both directions. With a small amount of preload pressing the inner rollers and outer rollers together, this force transmission mechanism will allow the direction of force transmission to be reversed with zero backlash. Unlike gear teeth where preload between the gears can lead to high levels of friction, wear, noise and even seizing, this preload is not detrimental to the present system because the rollers operate with pure rolling contact so there is very little efficiency loss that results from the preload.

Rigidity in a rotary actuator application of the speed change device, as one of many examples of how the present device could be used, is often a very desirable characteristic as it provides precise control and predictability of an actuated system. The rotational rigidity of the force transfer effect of the present device is potentially very high with the compression and partial shear of the preloaded (and the potentially very rigid) rollers being the primary area of deformation when loaded. Configurations like those used in the present device also allow the use of a high number of rollers (such as 19 or more and up to 50 or 100 or more) for increased traction and rigidity.

Note that although the traction embodiment of this disclosure has many advantages, gear tooth interfaces can be used on some or all if the contact areas and are also disclosed here.

The force transmission device described in FIGS. 1 through 4 demonstrate some of the working principles of the present device but does not provide speed change function between the two races. It is, in effect, an infinite speed ratio device where the ratio of motion from the direct movement if the rollers to the output (horizontal race relative movement) is 1:0 because the surface speed of the roller to race contacts is the same against both races.

This does not provide useful function as a speed change device but can be used for the support and isolation of components within an assembly.

Figure 5:
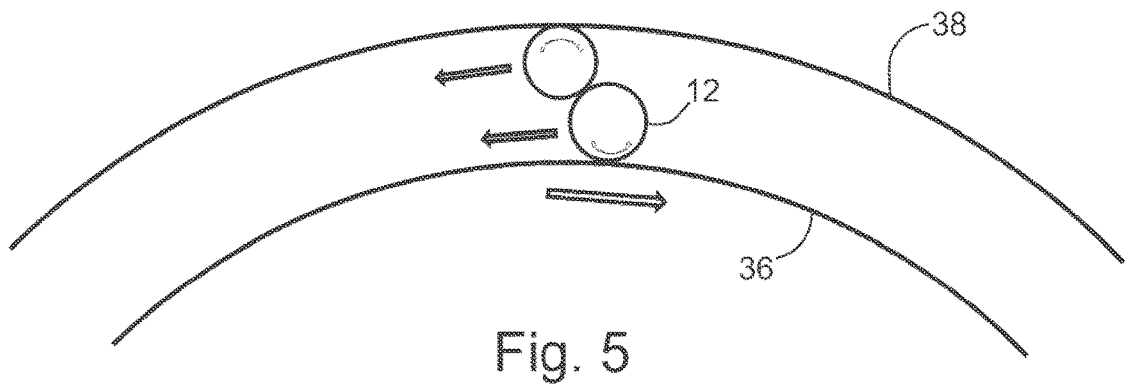
FIG. 5 shows two circular races and their direction of rotation about their individual axes white rotating in tandem between two fixed curved contact surfaces.

To use this principle to transfer torque from a fixed or rotatable race to another fixed or rotatable race, one or more sets of orbital rollers must be positioned between the circular outer diameter (OD or outer surface) of air inner race and the circular inner diameter (ID or inner surface) of an outer race. As the rollers are caused to rotate, they roll along the races due to traction (or geared) contact. The surface speed of the roller-to-race contacts is similar (as in the above examples with non-curved races) but the circumference of the contact surface of the inner race is less than the circumference of the contact surface of the outer race, so as the rollers rotate with the same or similar surface speed on each race and (assuming the rollers remain in contact with each other) they will cause the two circular races to rotate relative to each other as shown in FIG. 5. In FIG. 5, the outer race 36 fixed in and the inner race 38 rotates clockwise, and input to rollers 12 causes them to orbit counterclockwise.

The smaller the rollers, the closer the race diameters will be to each other (for a given traction angle) and the higher the speed change ratio between the roller orbiting speed and the speed of the output race relative to the reference (or fixed) race. (Note: For the purpose of this disclosure, one (or more in some configurations) of the races will be referred to as an output race, and the other/s will be referred to as the fixed or reference race/s and will be assumed to be fixed in space unless otherwise noted).

With less than ten roller sets (referring here to one "inner roller"—i.e. The roller in the set of two contacting rollers that is in contact with the OD of the inner race—and one "outer roller" (that is, the roller in the set of two contacting rollers that is in contact with the outer race) and assuming a full complement of roller sets (such that all the outer rollers are in contact with the inner roller in that set, and also in contact with the inner roller of the adjacent set) the speed change ratio is typically less than is desirable for many high torque, applications like robotics. A further disadvantage, if less than ten roller sets is used in a full complement arrangement (requiring relatively large rollers) is the uneven force distribution of the rollers on the races which requires thicker and heavier races to prevent unwanted race deformation. This race deformation is important to minimize in robotics and other applications because deformation of the races will be transferred into the structure which it is actuating causing unwanted movement and vibration as the rolling or geared components orbit around the actuator center axis.

A further non-obvious benefit of using more than ten roller sets is the increase of total traction force that results from a greater number of traction contacts.

Figure 54:
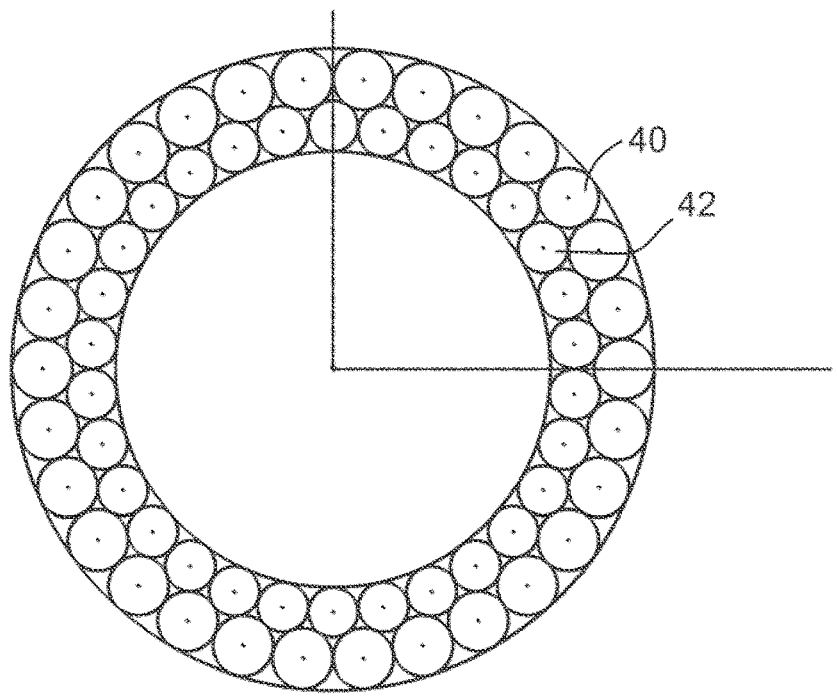

Increasing the number of rollers, without increasing the ID of the outer race, requires smaller rollers. Smaller rollers have the disadvantage if increased Hertzian stress for the same load per roller, but the attached investigation reveals that for a set outer race ID, the benefit of additional rollers increases dramatically from ten to fifteen roller sets even though the reduced Hertzian stress limit of the smaller rollers requires a reduction of the maximum load On each roller. Above fifteen rollers, the torque capacity benefit of additional roller sets is significantly less. The advantages of higher speed change ratios, and more consistent force distribution do continue to increase as rise number of rollers is increased however. Actuators with 10 or more, 19 or more, 20 or more, 30 or more, 40 or more, 50 or more, 60 or more, 70 or more, 80 or more, or 100 roller sets or more are envisioned by the inventor as being practical and beneficial, for many applications. As indicated in FIG. 54 for example, in some embodiments, referred to as full complement, the orbital rollers 40, 42 extend entirely around the annulus formed between the inner race and outer race, with each and every inner roller 42 being in rolling contact with two outer rollers 40 and each and every outer roller 40 being in rolling contact with two inner rollers 42.

Potential benefits of this principle as applied to the present speed change device include the following:

Zero backlash
High torque for size and weight
High rigidity for size and weight
High precision
High speed change ratio
Low torque input
Self-locking if needed
Back-drivable if needed
Integrated emergency override clutch if needed
Low profile
Light weight
Integrated air, electric or other type of motor
Large center through hole
Ease of integrating input and output encoders
High efficiency The contact stress calculations are based on Hertzian line contact with a correction for the maximum possible traction force which is based on the coefficient of friction between the two materials.

To find the allowable contact stress at one contact point two formulas are required:

$$b = \sqrt{\frac{2F}{\pi l} \cdot \frac{\frac{(1-v_1)^2}{E_1} + \frac{(1-v_2)^2}{E_2}}{\frac{1}{d_1} + \frac{1}{d_2}}} \quad (1)$$

$$P_{max} = \frac{2F}{\pi b l} \quad (2)$$

Where,
b=half width of elliptical contact profile
P_max=maximum stress experienced in the material
F=applied load
l=length of contact
E_1,E_2=Young's Moduli of respective materials
v_1,v_2=Poisson's ratios of respective materials
d_1,d_2=Diameters of respective cylinders, d is taken as being negative if the cylinder defines a concave, rather than a convex surface with respect to the contact area Pmax is given by the limiting factor, either the compressive strength of the material or the contact fatigue strength of the material (if available). Once Pmax has been determined, Fmax can be solved for by iterating between Equations (1) and (2). Iteration involve guessing one value, F for example, folding the corresponding b value from Equation (1), plugging the calculated value of b into Equation (2) and solving for a new F. This is repeated until the solution converges and F and b values are found which satisfy both equations.

Once a theoretical maximum load has been calculated from above, a traction factor is applied. The traction factor reduces the load to allow for the increase in contact stress due to surface shear. The algorithm for determining the increase in Pmax for a given coefficient of friction comes from TribologyABC.com and can be summarized by the following code snippet.

```
<!-- Interpolation for Tmax -->
if (mu>=0.0 && mu<0.15) {Tmax = 0.387 - (0.41-0.387)*(mu/0.15)};
if (mu>=0.15 && mu<0.3) {Tmax = 0.41 + (0.51-0.41)*(mu-0.15)/0.15};
if (mu>=0.3 && mu<0.4) {Tmax = 0.51 + (0.579-0.51)*(mu-0.3)/0.1};
if (mu>=0.4 && mu<0.5) {Tmax = 0.579 + (0.686-0.579)*(mu-0.4)/0.1};
if (mu>=0.5 && mu<0.6) {Tmax = 0.686 + (0.811-0.686)*(mu-0.5)/0.1};
if (mu>=0.6 && mu<0.7) {Tmax = 0.811 + (0.937-0.811)*(mu-0.6)/0.1};
if (mu>=0.7 && mu<0.8) {Tmax = 0.937 + (1.064-0.937)*(mu-0.7)/0.1};
if (mu>=0.8 && mu<0.9) {Tmax = 1.064 + (1.19-1.064)*(mu-0.8)/0.1};
if (mu>=0.9 && mu<=1.0) {Tmax = 1.19 - (1.317-1.19)*(mu-0.9)/0.1;
if (mu>I) {Tmax = "Undefined"};
dpc=(Tmax/0.387);
dFl= 1/(dpc*dpc);
<!-- Interpolation for Tmax -->
```

In the above algorithm, dpc represents a coefficient giving the increase in the maximum stress component experienced by the material. Similarly dF1, is a coefficient representing the decrease in the maximum allowable hertzian load. To correct for traction, one simply multiplies, the load calculated from the hertzian contact formulas by dF1.

Once the maximum load for one contact has been calculated, the torque carrying capacity of the actuator is calculated using a simple moment arm. The torque supplied by one contact point is given by:

$$T = Fd \quad (3)$$

Where: T=Torque; F=Max load; d=perpendicular distance between contact point and center of actuator The total torque for the actuator is then simply the torque for a single contact point multiplied by the number of rollers. For an actuator with rollers at different distances from center, the contacts which supply the least amount of torque are takers as being the limit on the torque capacity of the actuator.

Figure 6:
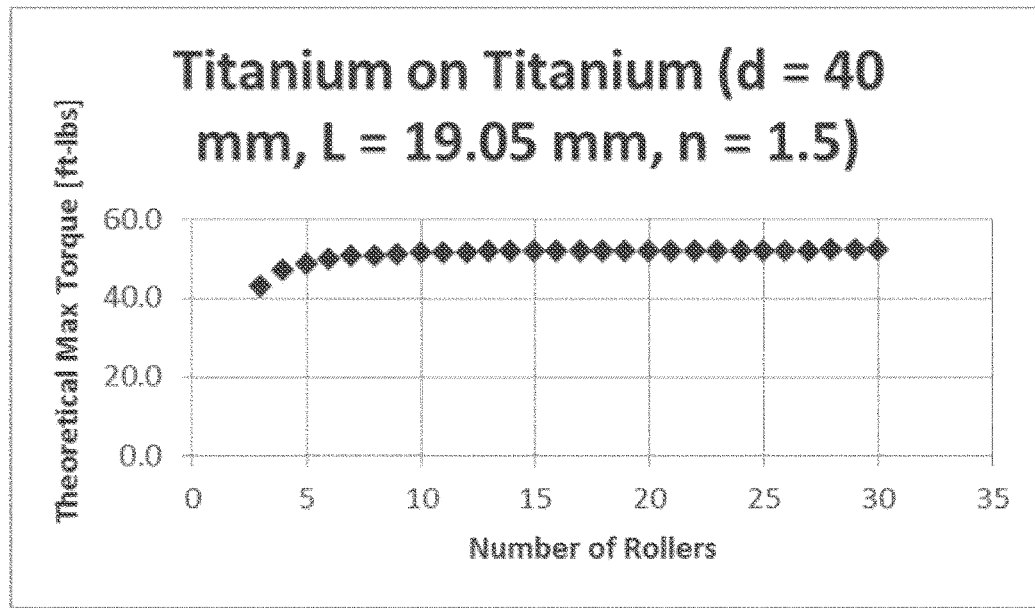
FIG. 6 charts the effect of the number of contacting rollers on theoretical max torque.

For an actuator with a pre-defined inner diameter, the effect of using an increasing number of smaller rollers is illustrated in FIG. 6.

The graph in FIG. 6 represents a titanium roller on a titanium inner ring. The diameter of the ring is 40 mm. The diameter used for the rollers is the largest diameter roller that can fit around the 40 mm ring for a given number of rollers, without having the rollers interfering with their neighbors. A small clearance has been added between each of the rollers, no correction has been made for surface shear due to traction, thus actual max torque would be somewhat lower.

Note, a non-full-complement speed change device is also possible in some embodiments but requires a means if spacing some or all of the rollers to achieve adequate preload. Several embodiments of a non-non-complement version, of the present device are disclosed in this document.

By matching the coefficient of friction to the traction angle, the present device can be tuned to increase the roller load with increased torque until failure, or until a predetermined maximum traction force or torque.

One method of limiting the maximum traction is to use rollers which energize in one rotational direction to preload the rollers, winch energize in the other rotational direction. The angle, preload, and coefficient of friction (CF or cf) between the materials in this case may be high enough to maintain traction up to a certain level of torque. The CF and angle is not sufficient on their own, however, to transmit torque without slipping once the preload of the opposing roller is reduced due to deformation of the load bearing low rollers in the opposite direction. At a certain level of torque, therefore, the preload of the opposing rollers will decrease (as the load on the driving direction roller/s increases) to the point where the opposing direction roller/s no longer provides adequate preload and the drive rollers are allowed to slip. The maximum torque before slippage of this configuration is decreased by increasing the roller angle, and/or by using material combination with a lower CF, and/or by reducing the initial preload.

Many combinations of materials are possible including (but not limited to) metallic, ceramic, plastic, polyamides, and elastomers.

More rollers results in a more consistent load on the races allowing thinner and lighter races with less deformation. For this reason, the present device is preferably configured with 10 or more, 11 or more, 12 or more, 13 or more, 14 or more, 15 or more, 16 or more, 17 or more, 18 or more, 19 or more, 20 or more, 25, or more, 30 or more, 35 or more, 40 or more, 45 or more, 50 or more, 55 or more, 60 or more, 65, 70 or more, 75 or more, 80 or more, 85 or more, 90 or more, 95 or more, or 100 or more roller sets. A roller set consisting of one sneer roller contacting the OD of the inner race and one enter roller contacting the ID of the outer race, with the inner and outer roller of each set contacting each other.

The required coefficient of friction to achieve self-energizing (or camming) is explained as follows. The traction angle, as defined in this application, is the angle between a radial line from the center axis of the races through a contact point of a roller on a race. The other line in the angle measurement for an inner roller is the line from the inner roller contact with the inner race to the roller/race contact of outer roller (which the inner roller is contacting) with the outer race.

Figure 7:
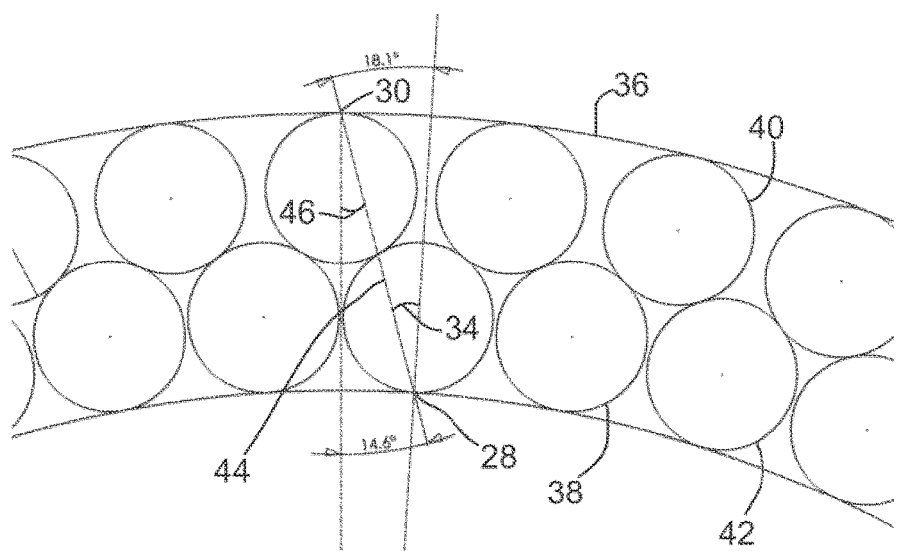
FIG. 7 shows the angle between a radial line from the center axis of the races through a contact point of a roller on a race, called the fraction angle line.

Referring to FIG. 7, the angle 46 for the outer roller 40 contact is also shown in FIG. 7, but it is typically lower than the inner roller 42 contact angle, so the limiting-angle with regard to establishing a self-energizing or "camming" traction drive system will be the larger of the two angles. This larger angle (18.1° in FIG. 7) will determine the required CF for the inner roller and race contact to establish a self-energizing traction angle 34.

When one of the inner race 38 or enter race 36 is fixed (the enter race in this example) and a torque is applied to other race (a counterclockwise torque on the inner race, in this example) the traction of the inner roller against the inner race (at contact 28) will create a force that is transferred through the contact with the outer roller 44 through to the outer roller contact with the outer race at contact 30.

If the relative diameters of the inner rollers 42 and outer rollers 40 and inner races 38 and outer races 36 results in a preloading of contacts 28, 30 and 44, the amount of this preload and the coefficient of friction of these contacts will determine the traction torque capacity of the present device if the traction angle is not adequate for that coefficient of friction to establish a self-energizing.

Figure 8:
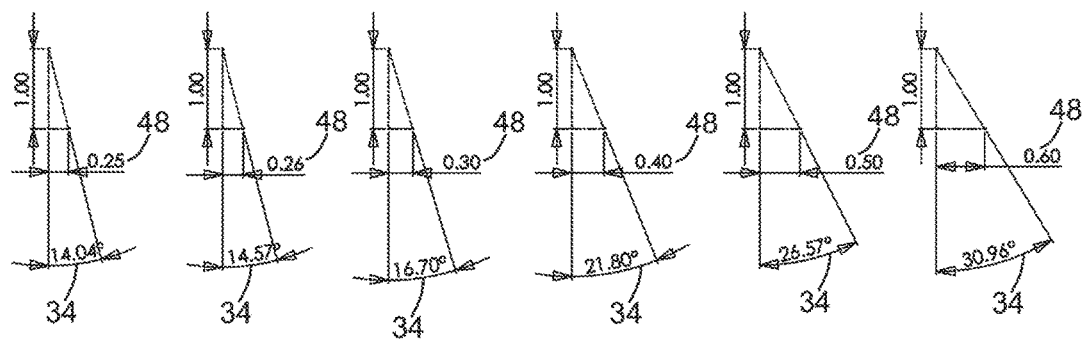
FIG. 8 shows a variety of traction angle lines and the required coefficient of friction to produce traction.
Figure 11:
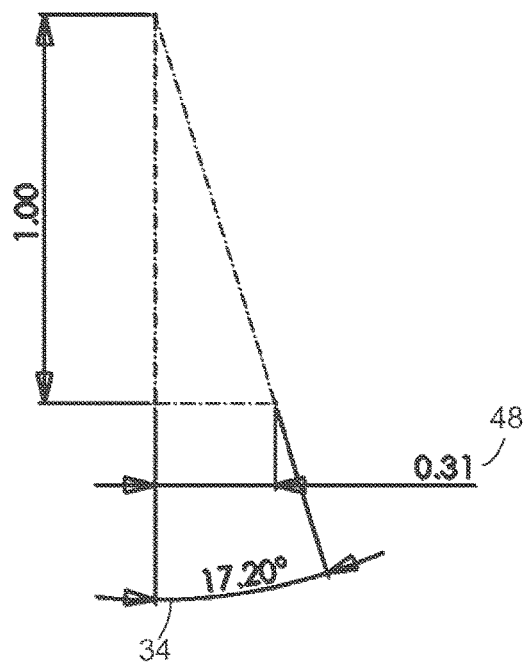
FIG. 11 shows the minimum coefficient of friction required to achieve the desire effect in the embodiment of FIG. 10.

Referring to FIG. 8 several examples of a range of traction angles 34 are shown along with the minimum coefficient of friction limit 48 for each angle. In order to establish a self-energizing system whereby an increase in the contact force of the rollers will result from increased torque transmission through the device, the traction angle must be above the traction angle show. In order to account for inconsistencies in material prop reduce, and in order to provide a consistent and predictable result, it is preferable that the traction angle, for a given minimal CF, the higher than the traction angle shown in FIG. 8. FIG. 11 shows a further example of a traction angle. The required coefficient of friction to produce traction must exceed the minimum coefficient of friction limit 48 for the associated traction angle 34 for that CF.

For a speed change device of the present design, with each roller having a single traction contact diameter, the minimum traction angle achievable if all rollers are the same diameter is approximately 15°. Practically speaking, for most conceivable applications, the minimum traction angle will be closer to approximately 17° with 18° or 19° being common for many conceivable embodiments of the present speed change design. For these common geometries for the present device, then, a coefficient of friction of 0.4 or greater will ensure that the system is self-energizing under load, while it is also possible to design a speed change device of the present design to achieve a self-energizing traction angle with a material coefficient of friction of as low as 0.34 or lower in some configurations.

Each of the inner race and outer race are circular and thus centered on an axis, as shown for example in FIG. 54. The traction angle ø may be defined as follows: for each pair of a first inner roller that contacts a first outer roller, the traction angle ø is defined as the angle between a first line extending outward from the axis through a center of the first inner roller and a second line extending from the contact point of the first outer roller, with the outer race and a contact point of the first inner roller with the inner race. Thus, according to the geometric representations in FIG. 8, where the first inner roller contacts the inner race with a first coefficient of friction cf1 and the first outer roller contacts, the outer rage with a second coefficient of faction cf2, cf1>tan (ø) and cf2>tan (ø). Various traction angles may be used, for example: less than or equal to 45, 40, 39, 38, 37, 36, 35, 34, 33, 32, 31, 30, 29, 28, 27, 26, 25, 24, 23, 22, 21, 20, 19, 18, 17, 16 or 15 degrees, with corresponding limitations on the coefficients of friction. In some embodiments, when the inner rollers contact the inner race with a first coefficient of diction cf1 and the outer rollers contact the outer race with a second coefficient of friction cf2, at least one of cf1 and cf2 is 0.27, 0.28, 0.29, 0.30, 0.31, 0.32, 0.33, 0.34, 0.35, 0.36, 0.37, 0.38, 0.39, 0.40, 0.45, 0.50 or 0.60 or greater.

Figure 9:
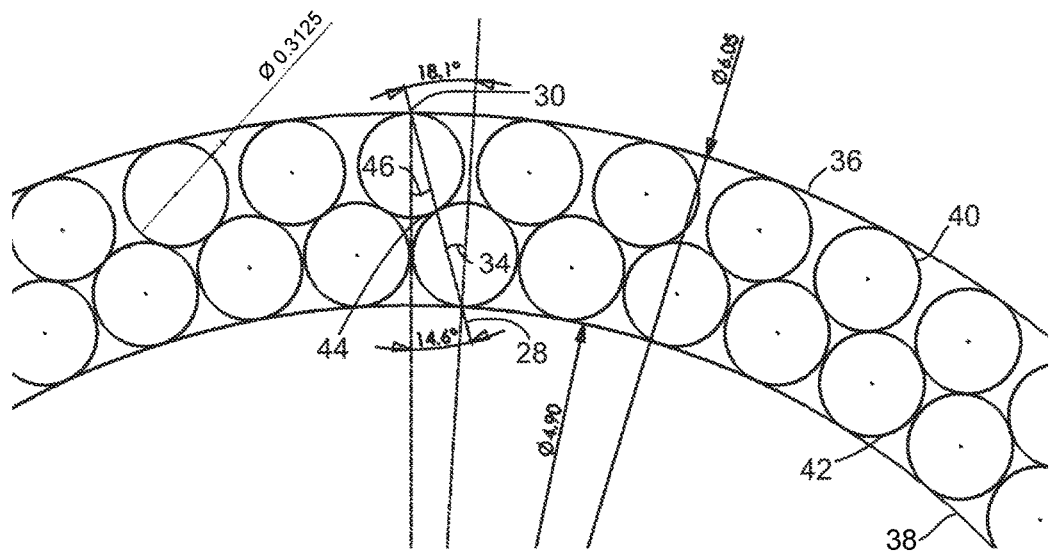
FIG. 9 shows an example of a set of rollers on a race using 34 roller sets, where all of the inner rollers are contacting two outer rollers, and all of the outer rollers are contacting two inner rollers.

For purposes of scale, FIG. 9 shows a configuration of the present device showing a typical roller diameter for an outer race 36 ID of 6.05". This example uses 34 roller sets (i.e. 34 inner rollers 42 and 34 outer rollers 40). One roller set comprises one inner roller 42 and one outer roller 40.

All of the inner rollers all preferably contacting two outer rollers, and all of the outer rollers are preferably contacting two/inner rollers to provide what is referred to here as a "full complement" assembly.

Figure 10:
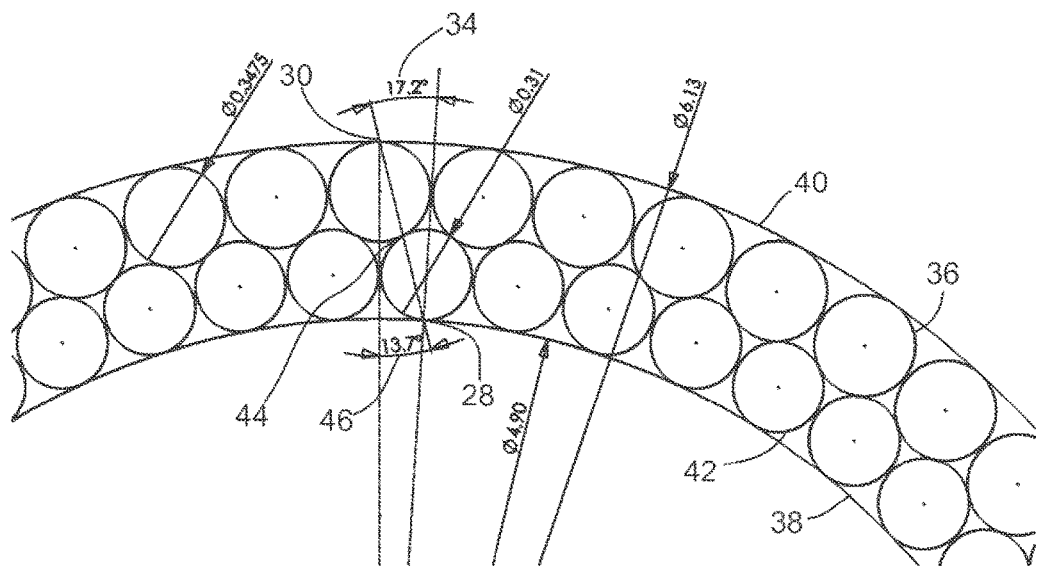
FIG. 10 shows an example of a set of rollers on a race as in FIG. 9 where the outer rollers are larger than the inner rollers.

As shown in FIG. 10, increasing the size of the outer rollers 40 relative to the inner rollers 42 will result in a redaction of the necessary traction angle 34 to will allow the use of lower CF material combinations.

The CF for the inner roller race contact 28 in this case would need to be greater than 0.31 in order to achieve a self-energizing camming effect (independent of the initial roller contact preload).

Figure 12:
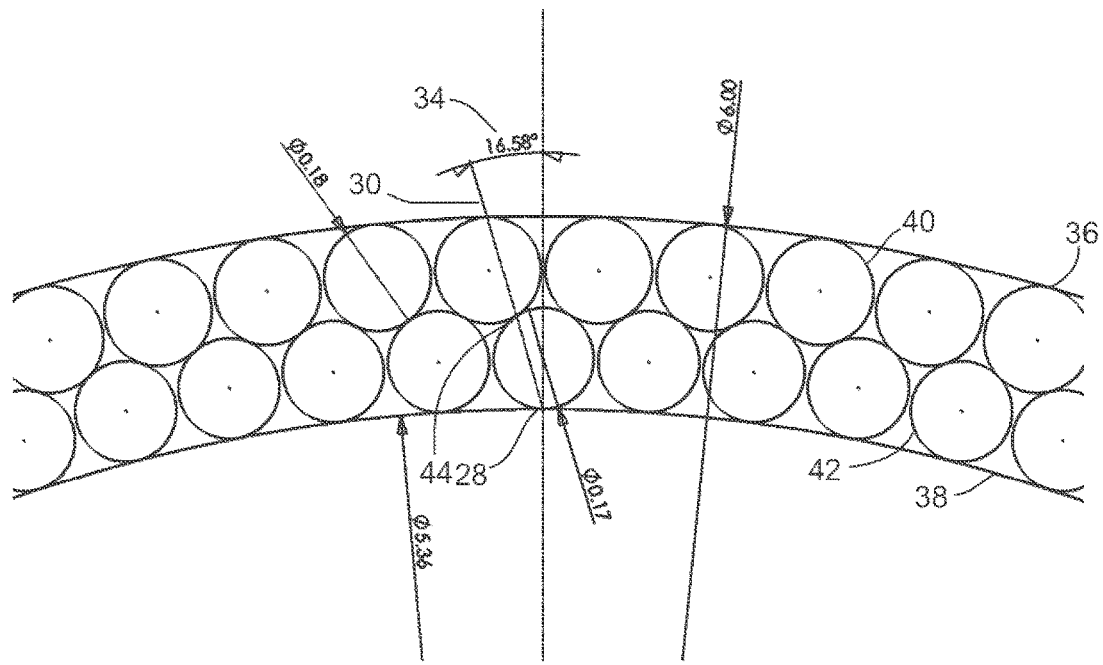
FIG. 12 shows an example of a set of rollers on a race using 100 roller sets.

Increasing the number of roller sets (using smaller rollers) will also decrease the necessary traction angle 34 as shown schematically in FIG. 12, for example, with 100 roller sets, composing 100 inner rollers 42 and 100 outer rollers 40.

Figure 13:
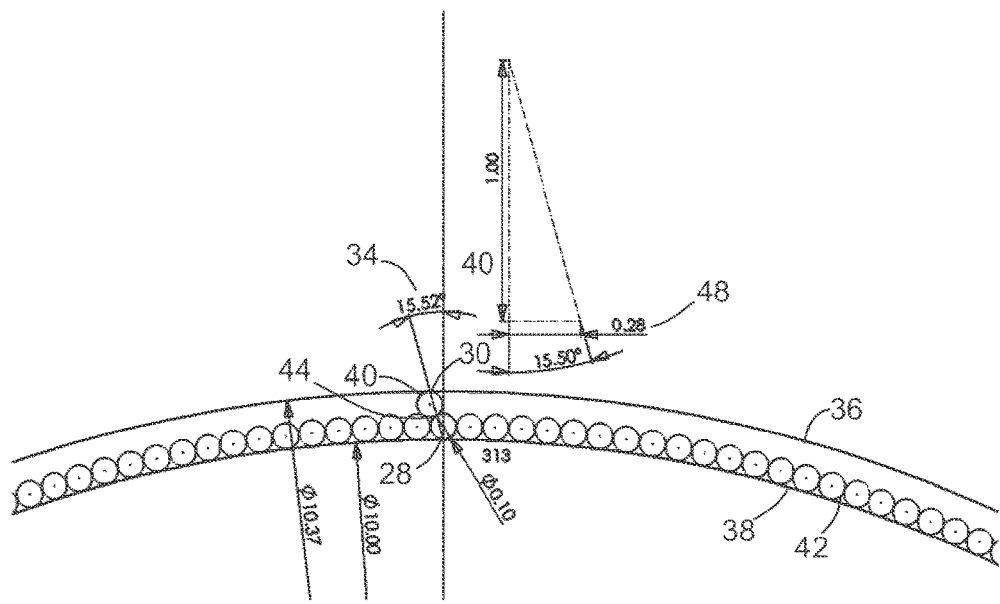
FIG. 13 shows an example of a set of rollers on race using 313 roller sets.

An extreme example of a full complement speed change device of the present, design is shown schematically in FIG. 13 with 313 roller sets. With these very small rollers (relative to the diameter of the races) it is necessary to use the material combination for the inner roller-to-inner race traction contact which is higher than 0.28 in order to create a self energizing torque transfer multi-element self-energizing device.

Note: although the coefficient of friction 48 of 0.28 or higher is required for most speed change device configurations of the present device, there are certainly benefits to a device of the present design with a traction angle and CF which does not achieve a self-energizing effect. Benefits of such a device include a very predictable breakaway torque which can be useful, for example, but not limited to, robotic applications where interaction with humans is expected. For these and other reasons, and to account for other system variables which may be difficult to predict precisely when creating a self-energizing speed change device of the present design, coefficients of friction of 0.2 or higher are included here as optional design parameters.

Note: the traction angle for the outer roller against the outer race is generally lower than the traction angle of the inner rollers against the inner race. For this reason a slightly lower coefficient of friction can be used for the outer roller/race contact. The contact between the inner and outer rollers in each torque transmitting set will also require a minimum coefficient of friction. It has been established by experimentation that using materials with a similar coefficient of friction between the rollers as the coefficient of friction between the rollers and the races is adequate to achieve a self-energizing effect with a full complement system as disclosed in this document.

Figure 14:
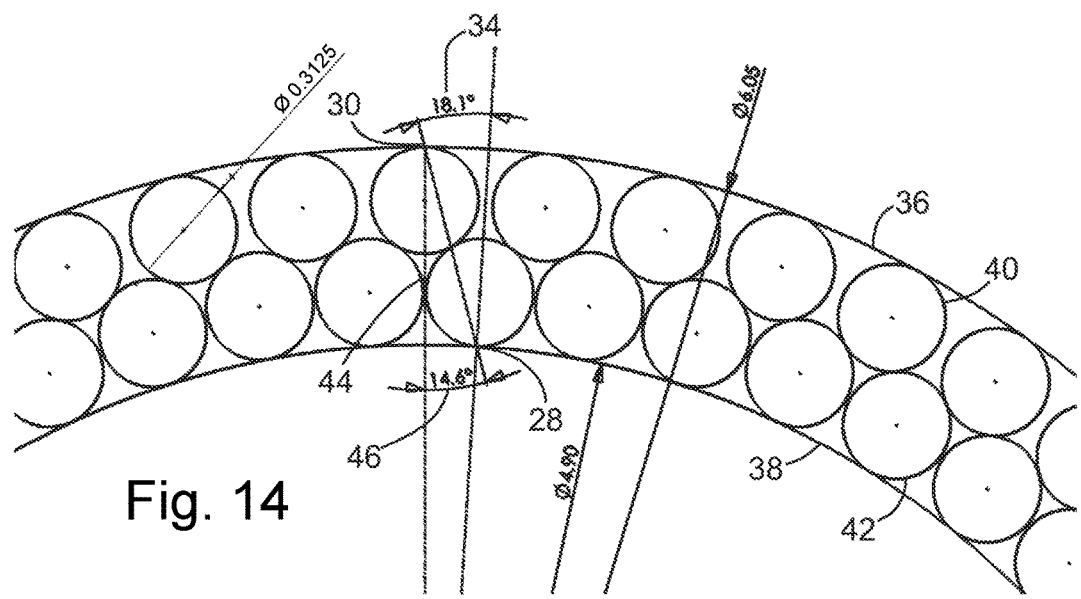
FIG. 14 shows geometry of traction angles.

Referring to FIG. 14, a further example of the present design is shown, showing outer rollers 40, inner rollers 42, outer race 36, inner race 38, contacts 28, 30 and 44, traction angle 34 and angle 46 for the outer roller contact.

There are many material combinations which achieve a coefficient of friction of 0.28 or higher. These include but are by no means limited to the following (the following are, however, considered to be preferable materials for the reasons listed below). Many other materials exist or are like to exist in the future which fulfill the preferable requirements of a coefficient of friction of 28 or higher and good rolling contact characteristics. Other characteristics such as a reduction of the coefficient of friction with increased contact load, such as is exhibited by certain formulations and heat treatments of spinodal bronze, are also believed to be beneficial for certain applications.

Beryllium copper—This material has a high coefficient of friction when running without lubrication against steel and the low coefficient of friction when running against itself. A preferable configuration of the present speed change device would include a combination of beryllium copper and steel rollers and races such that that contacts which require traction are beryllium copper against steel and contacts which require a low coefficient of friction are beryllium copper against beryllium copper. An example would be a beryllium copper inner race, steel inner rollers, beryllium copper outer rollers, and the steel outer race. A more preferable combination would include a steel inner race, beryllium copper inner rollers, steel outer rollers, and the beryllium copper outer race. In this case, and some applications, the inner rollers could be designed to be nearly contacting each other, and the low coefficient of friction of the beryllium copper on itself could act as a simple spacing system for the inner rollers.

Steel with boron diffusion surface treatment—This material/surface treatment has a high coefficient of friction when running without lubrication against steel or itself.

Titanium—Titanium has some unique properties which include a relatively low modulus of elasticity (which reduces the Hertzian stress of the contacts) light weight, high strength and a relatively high coefficient of friction.

Kevlar reinforced Torlon—There are many different injection moldable materials which could be used as rollers and or races for certain configurations up the present device. Kevlar reinforced Torlon has a relatively high coefficient of friction and exhibits very low cold flow which is a benefit for a preloaded rolling contact system. The use of this material, or others with similar properties, could allow the injection molding of rollers and or races for low cost production. The use of steel inserts running against the Torlon in a number of different potential combinations, may be a preferable combination of materials for certain applications, where low cost, low weight, and low to medium torque are required.

Steel—Many different types of steel will provide the necessary characteristics in combination with the above materials and/or many other materials now existing or possibly existing in the future.

The above list is in no way necessarily limiting, but rather, an example of some preferable materials which can be used with the present speed change device.

Figure 15:
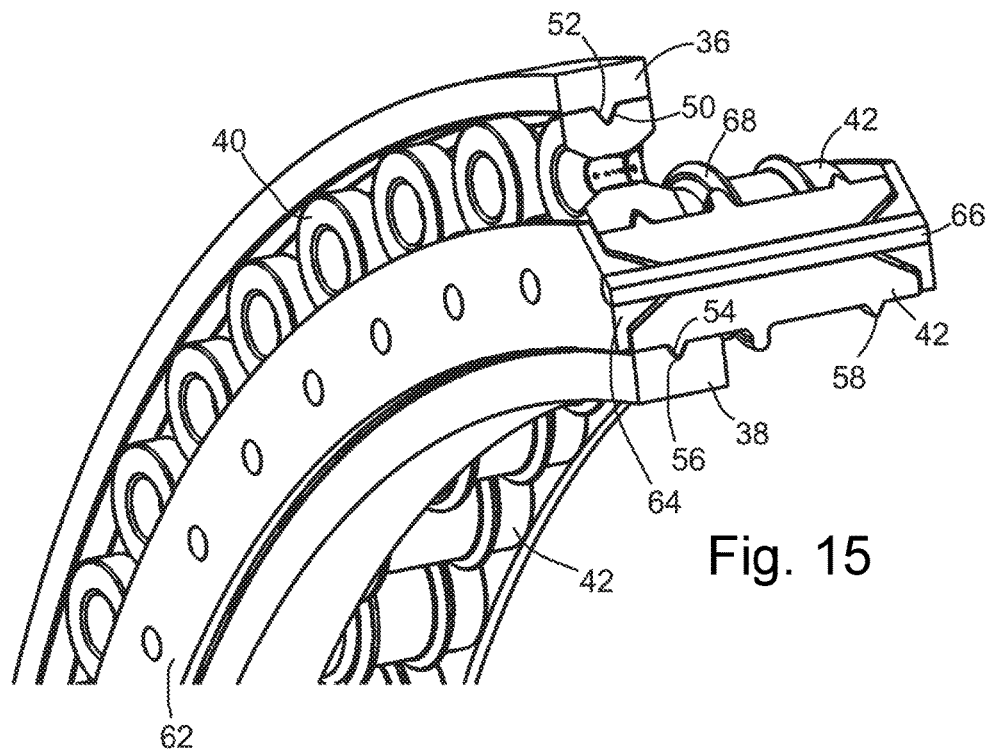
FIG. 15 shows a simplified partial section of an embodiment of a speed change device.

FIG. 15 shows a partial section through the center of an outer roller 40 and an inner roller 42 in a set and the inner 38 and outer races 36 (some parts not shown, for clarity). The inner race may be formed of split races 38 and one not shown but the same item on the other side of the structure, and the outer race may be formed of split races 36 and one not shown but the same item on the other side of the structure. The split races may be secured together by a housing, not shown in this figure. In this embodiment of the present device, a conical surface 50 on the annular double conical groove in the outer roller will contact the surface 52 on the raised double conical ring on the ID of the outer race if the outer roller 40 strays to the left in this illustration. If the outer roller 40 strays to the right in this illustration, the opposite surfaces will contact. Using a groove in the outer roller with a race on either side of a center plane of the outer roller will cause the contact to occur at a smaller radial distance from the center of the outer roller then the radial distance of the outer roller traction contact with the outer race. This will cause the roller to slow down on the side of the plane that is further ahead in the rolling direction than its ideal position such that it is steering towards the edge of the race, and so by slowing this end of the roller down, it will cause it to change angle back to a more aligned position, or if it is already aligned, but simply displaced axially towards and edge of the race, slowing the rotation of the end of the roller which is opposite the edge of the race to which the roller is off center to ward, will change the angle of the roller such that it will steer back toward the ideal centered position A raised double conical annular ring 54 on the inner roller will not contact the conical face of the annular groove on the OD of the inner races 56 if it moves to the right in this illustration because the outward facing conical face on the inner roller 58 will contact first (inner race on the right side with conical groove not shown). The contact 58 is a greater radial distance from the center of the inner roller than the cylindrical traction surface of the inner roller and will, therefore, have a greater surface speed than the cylindrical traction surface for a given roller rotation causing the right end of the roller, in this example, to increase in speed when it is rolling partially on the larger diameter contact 58 so as to steer it back toward center. The opposite will occur if the inner roller moves towards the left side of the inner races.

Annular grooves, instead of rings, on the inner roller (similar to the outer roller in this illustration) could also be used instead of or in addition to, the rings shown here.

The groove 60 is preferably designed for clearance so these conical surfaces between the rollers do not ever come into contact.

The cage 62 in this embodiment is an example of a low-profile, simple to assemble, alignment means for the inner rollers. It uses a thicker boss 64 which partially protrudes into the ends of the inner rollers (in this embodiment, although a similar structure could be used with the outer rollers instead of or as well) to provide a stable and preferably press fit attachment for the pins 66 which are used for spacing the inner rotors equally around the inner race, and/or to align the inner roller center axes parallel with the axis of the inner and outer races. Because of the potentially large number of these pins, corresponding to the potentially large number of rollers, even if these pins are a relatively small diameter, they will be adequate to maintain the torsional rigidity of the cage assembly necessary for effect of alignment, in many applications. As an additional benefit the smaller the diameter of these pins, the less frictional force they will exert on the rollers. A material like spinodal bronze or beryllium copper can have a relatively low coefficient of friction on itself. For this reason the use of a material like spinodal bronze or beryllium copper for the inner rollers as well as for the cage and possibly for the pins 66 is a preferred configuration. A material like beryllium copper has a much higher coefficient of friction when running dry against steel then it does against itself. For this reason it is preferable in the example given here, to use a harder material such as, but not limited to, hardened steel for the outer rollers and the inner races. The outer races are, in this example, preferably of the material such as, but not limited to, beryllium copper or spinodal bonze.

Various combinations of these materials (such as the inverse to what is described here) are anticipated by the inventor. The purpose of this disclosure is to describe preferred embodiments of the present device and its various working principles. Many different variations and combinations of the features disclosed here are anticipated by the inventor and can be implemented with various effects without straying from the principles disclosed here.

The raised center disks 68 on the inner rollers am used to provide the traction (or possibly geared) input to the actuator with an annular ring member (not shown in this illustration). These larger diameter disks can be on every inner or outer roller or on every second inner or outer roller or on every third inner or outer roller, but all of the disks 68 are preferably on rollers in the same row, for example on the inner rollers exclusively or the outer rollers exclusively). An outer housing member attaching the two outer races together, and in inner housing member attaching the two inner races together are also not shown here. A similar pin alignment cage structure to cage 62 can also be provided for the individual outer rotors.

Figure 16:
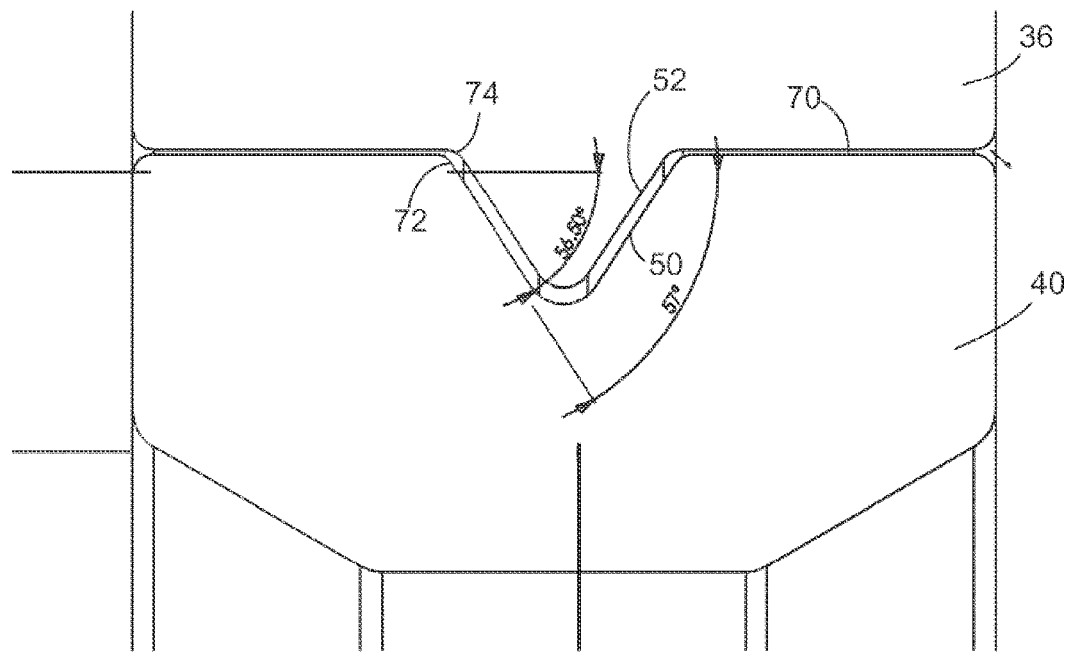
FIG. 16 shows an example of the conical angle of the contacting alignment faces shown in FIG. 15.

Referring to FIG. 16, the conical angle of the contacting alignment faces (for example conical face 50 and 52 in this embodiment) are preferably different by a large enough angle that when the roller is off center (to the left in this illustration) the contact between the ring and groove will begin adjacent to the cylindrical traction surface 18, and if the misalignment of the roller 40 is great enough, the contact will cause movement or deformation of the surfaces 50 and 52, such that the edge of contact between the conical faces 5 and 6 which is furthest from the conical traction surface 70 will move progressively further away from the conical traction surface 70 as the misalignment increases. This will provide the effect of a progressively greater alignment steering effect as the misalignment of the roller increases. This or similar geometry can be used for any of the conical alignment surface is disclosed in this document. Conical surfaces begin to contact adjacent to cylindrical traction surface. Innermost edge of contact between conical surfaces moves progressively away from cylindrical traction surface with increased misalignment of the roller (with leftward movement of the roller in this illustration). A variation of this preferred embodiment of this self-steering alignment system uses a smaller convex radius on the edge 72 then on the concave radios 74. This difference in radii will also contribute to a smooth transition from cylindrical rolling contact to partially conical rolling contact during alignment.

FIG. 15 shows is a simplified partial cross-section view of a LiiveDriive speed change device with a preferred roller spacing and alignment cage 62. The cage is a low-profile construction to reduce the necessary with of the assembly and includes a preferably elliptical boss 64 which provides a deeper bore to preferably press fit a cross member such as a dowel pin 66. The cross member, which is preferably coaxially assembled through three or more, but preferably all of the inner rollers, and or three or more but preferably all of the outer rollers. If a large number of cross members such as ten or more, for example, the torsional rigidity of the cage assembly can be high enough to provide angular alignment stability to the rollers, even with the use of relatively small diameter crossmembers.

An advantage of using small diameter crossmembers is a reduction of friction between the crossmembers and the rollers for higher speeds and efficiencies. Lower friction is especially preferable in applications of the LiiveDriive which do not use lubrication.

The tapered bores in the ends of the rollers are a preferable structural element in that they allow for the boss to on the cage and also provide a centering feature for manufacturing and potentially, re-machining of the rollers to a smaller size for a refurbished device after the surface of the rollers have been all or part way through their useful fatigue life.

Figure 17:
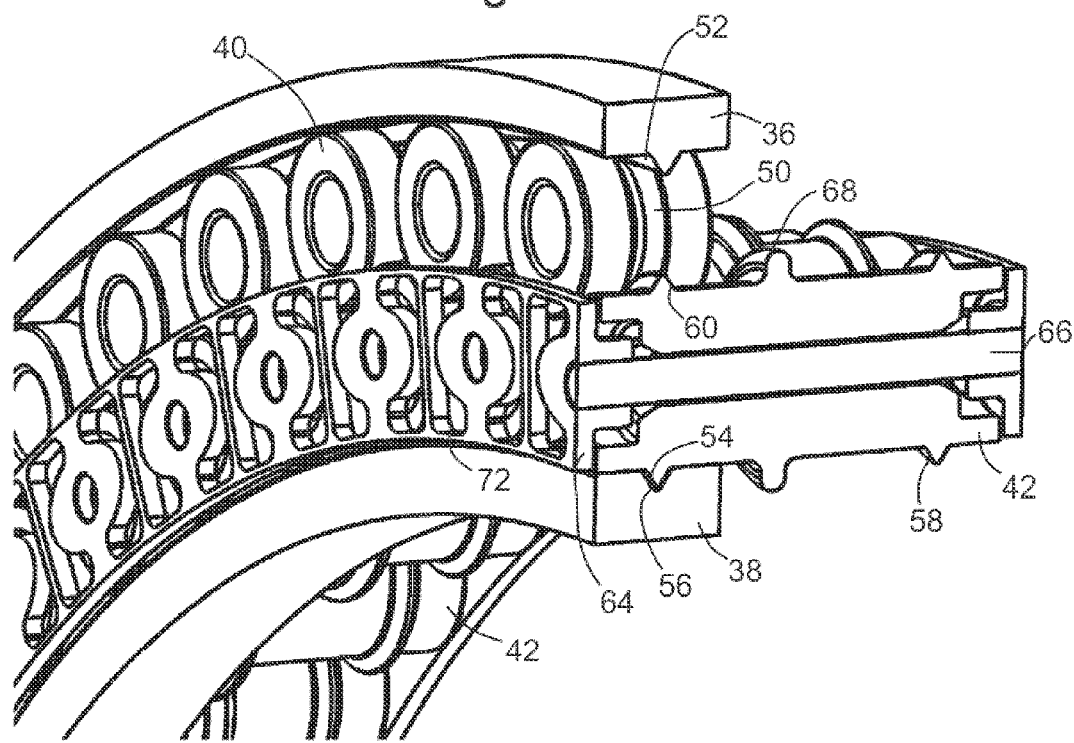
FIG. 17 shows a simplified partial section of the present device with the cover of the inner race removed.

Another example of a preferred cage configuration is shown in FIG. 17 (as with other figures in this application, the figure is missing the inner and outer races on the far side and some other components of a complete speed change device such as the housing and means of attaching the inner and outer races to a fixed and output structure). In FIG. 17, the outer rollers 40 are formed of axially aligned roller sections. Two are shown, but there could be more. The inner rollers 42 are longer than the outer roller sections. This arrangement may be reversed, with the inner rollers being formed in axially aligned sections. The tapered features its the roller ends are still present, but a larger cylindrical bore in the ends of the inner rollers (in this example, although the same could be done on the outer rollers, and the long rollers could be used as outer rollers, and the short rollers used as the inner rollers). The cage is designed with thin sections 72 which allow slight radial movement of the crossmembers. This radial movement can accommodate for manufacturing variables, but can also allow the crossmembers to move outwardly cheering high rotational speed operation. In this case the cross numbers can be brought into closer proximity to or even contacting live through bore in the roller thereby increasing the precision of the angular alignment.

Figure 18:
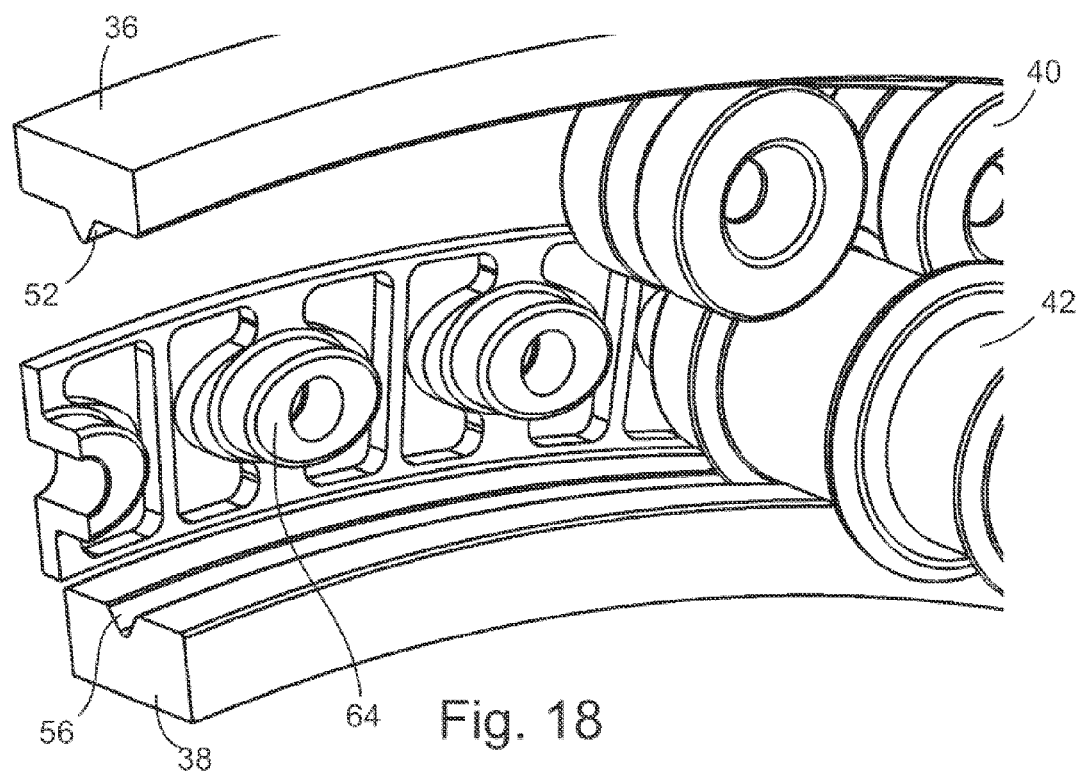
FIG. 18 show a partial view of an embodiment of a speed change device showing a preferable elliptical shape of the bosses.

FIG. 18 shows a partial view of the assembly shows a preferably elliptical shape of the bosses 64.

Figure 19:
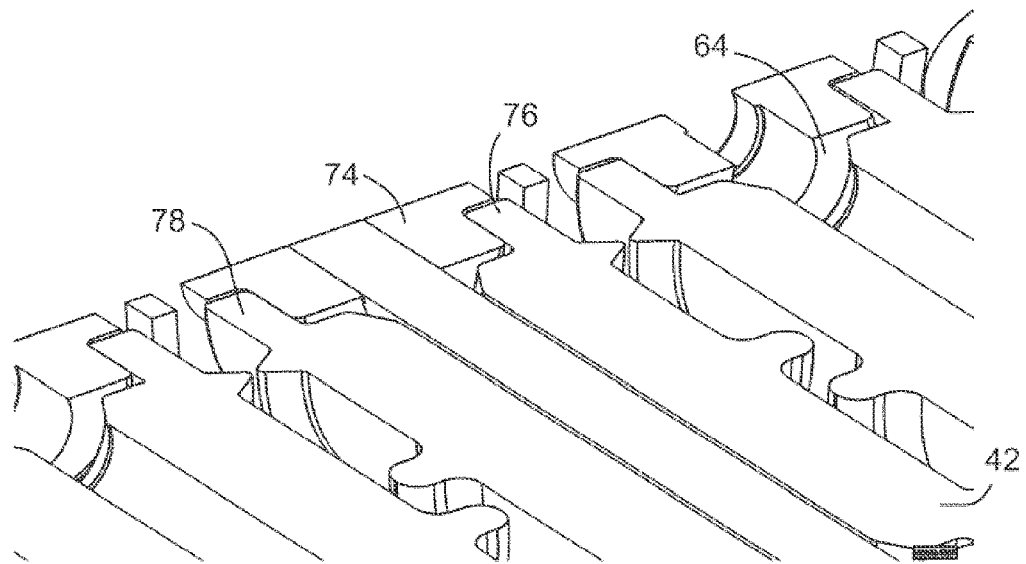
FIG. 19 shows a sectional view of bosses of FIG. 18.

FIG. 19 shows the wider surface 74 of the preferably elliptical (but other shapes which are narrower along a radius from the center of the actuator and wider perpendicular to this radius can also be used) boss 64 is closely situated to the forward and leading inside cylindrical surface of the ends 76 and 78 of the rollers.

Figure 20:
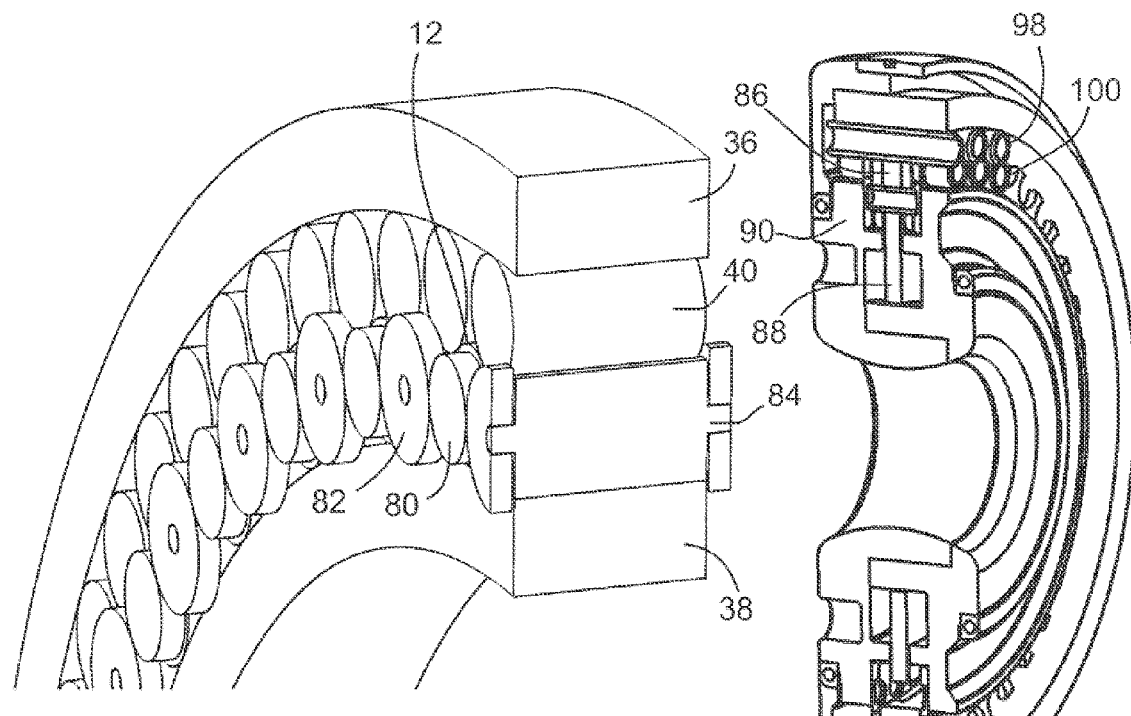
FIG. 20 shows a schematic view of a rolling contact roller spacing system.

A simplified schematic view of a primarily rolling contact roller spacing system is shown, in FIG. 20. The system may be used on the inside rollers 42 or outside rollers 40, but is shown here on the inside rollers as an example. The preferred embodiment of this concept uses a smaller diameter boss on the ends of separated for example every second (but every fourth or sixth) roller in the same (inner or outer) row and a circular disk or ring 82 which can rotate on boss 84. Another boss 80 on the end of an intervening roller 12 in the same row that is halfway between the two rollers with the disks 82 cooperates with the circular members 82 to space the rollers. This boss can be the same size as the roller 12, smaller than the roller 12, or larger diameter than the roller 12. The combination of diameters of the boss 80 and the disk 82 are such that very little if any clearance exists between the disk 82 and the adjacent boss 80. It may even be preferable to provide a small amount of preload on these contacts and in so doing provide a method of precisely spacing one of the rows of rollers with a primarily rolling contact. If the inner rollers can be spaced equally with this or one of the other methods disclosed in this document or a variation of these methods or some other method which is obvious from those described here, or some other practical means, the inner and outer races can be totally positioned coaxially without stress on an additional external bearing or bearings, or may even eliminate the need for a radially loaded additional bearing altogether.

Other bearing systems which can be used include external bearing cages similar to those used for cylindrical roller bearings. These conventional external bearing cages have the disadvantage of sliding on the largest diameter of the rollers and can, for this reason, result in higher friction and wear them in the preferred systems shown here.

Another possible cage system would not use a bore through the center of the rollers for the crossmembers but rather, would use the gaps between the rollers for the crossmembers, or for crossmembers in addition to those through the center of the rollers. Alignment surfaces on the cage could in this case contact the outer traction surface of the rollers, or a smaller diameter surface preferably near or at the ends of the rollers.

There are a number of inherent disadvantages to achieving high reduction ratios in a single stage, such as with a harmonic drive. These include decreased efficiency due to a movement of the high torque output resulting in significant power loss through friction. Increased wear of these highly loaded and high speed components is also a potential effect.

A common reason for avoiding multiple stages is the increase of backlash that results from more than one stage of conventional system that will typically geared device which will typically exhibit some degree of backlash.

Embodiments of the present device, by contrast, do not necessarily display any inherent backlash, and so the precision remains extremely high, and zero backlash us still achievable, even by combining two or more stages.

With the backlash removed from the system, the potential advantages of multiple stages include, but are not limited to, the following:

The lower speed of the final stage reduces the frequency (and potentially the energy level of) output vibrations which could result from higher speed movement of single high ratio stage.

The lower speed final stage can be more efficient because the highest load of the final stage is moving at a lower speed, and so any efficiency loss at the traction of geared contacts is lower than if they were moving at higher speeds as with a single stage high reduction ratio system such as a harmonic drive or compound planetary or geared differential speed reducer.

Higher efficiency will, in this case, increase backdriveability as well, making a higher ratio actuator backdrivable than a single stage device. Backdrivability is considered to be beneficial in many applications.

For the cylindrical rolling elements if the present device, axial positioning of the rollers is a critical function and is less challenging with slower moving rollers in the final stage of a multi-stage embodiment.

With two or more stages, it us much easier to achieve a low friction input to the first stage because the output torque of a preliminary stage will be significantly lower requiring significantly less traction force and resulting in less friction. This is very beneficial because using a high speed, low torque motor or air turbine etc., can allow for a lighter, smaller, and leas expensive speed change device. A preliminary speed change stage may be designed in accordance with the principles disclosed here or have a different, conventional, design.

Figure 21:
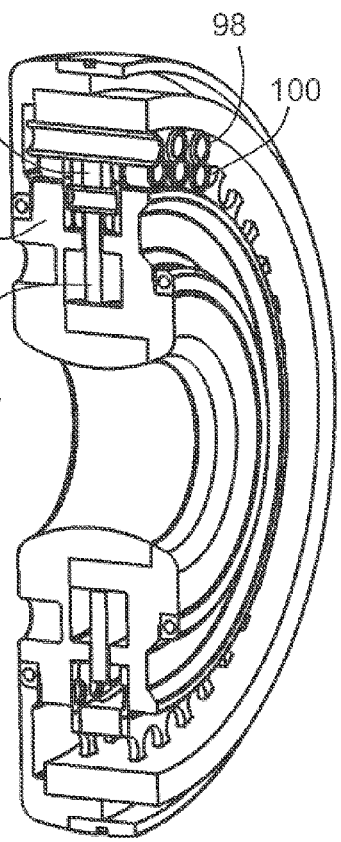
FIG. 21 shows a simplified partial section a multiple stage multi-element self-energizing speed change actuator.

FIG. 21 shows a simplified partial sectioned example of a staged embodiment of the present device.

Figure 22:
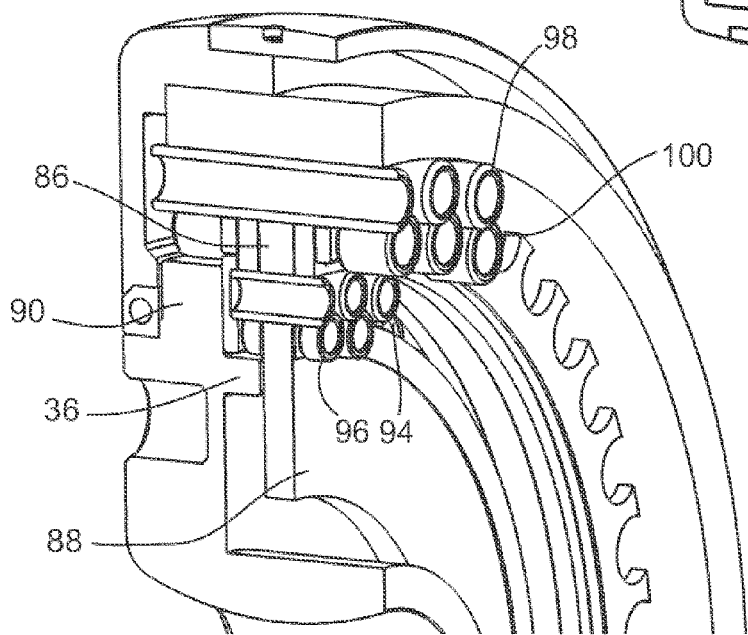
FIG. 22 shows the embodiment of FIG. 21 where the inner race is removed.

Referring to FIG. 22, removing the inner race on the right side reveals a representative sampling of an array of preferably smaller (than in the final stage) inner rollers 96 and outer rollers 94 in the first speed change stage. The input ring to the first stage 88 is preferably a traction drive system which causes the outer rollers 40 to spin but can also be a geared input similar to that shown in other embodiments in this disclosure. The outer rollers 40 self-energize (cam) between A] the first stage inner race 36 which is preferably one piece with (or a fixed member relative to) the inner race 90 of the subsequent (and in this example, final) stage and B] the final stage input ring 86. Outer rollers 98 and inner rollers 100 of the second stage are also shown. In this example, inner rollers 100 are formed of axially aligned roller sections, while the outer rollers 98 are longer.

Referring to FIG. 23, the final stage input ring 86, is preferably able to expand radially outward so that the self-energizing of the first stage will expand it against the outer rollers 98 of the second (and in this case final) stage when torque is applied to the input ring.

Referring to FIG. 24, an example of one of many possible methods of providing a radially expanding inner ring 86 is shown here. The ring has two or more (in this case three) interlocking split rings which can expand individually but always maintain enough rotational alignment that the discontinuities 92 of all the rings to not ever line-up axially. These discontinuities (or breaks, or gaps) in the rings are preferably also angulation as shown here so the force on the rollers from the races is maintained as consistently as possible.

Figure 25:
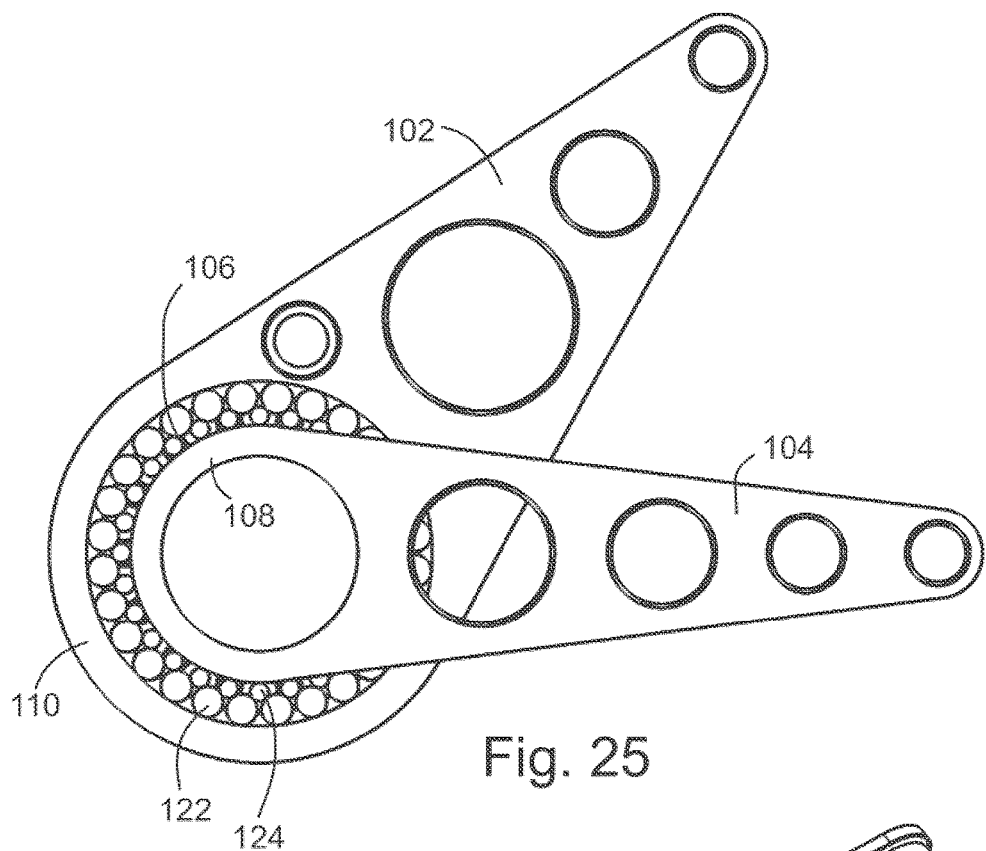
FIG. 25 shows a preferred embodiment of a geared input drive of an embodiment of a speed change device.

FIG. 25 shows a simplified but functional configuration of a preferred geared input drive embodiment of the present speed change device. It comprises a fixed member 102, output member 104, an outer array of fraction rollers 122, and an inner array of fraction rollers 124 with geared input members 106, an inner traction race 108 and outer traction race 110. The fixed member 102 and output member 104 may function as housings to hold split races together. In these drive configurations, any one of the various roller designs may be used, including axially aligned roller sections.

Figure 26:
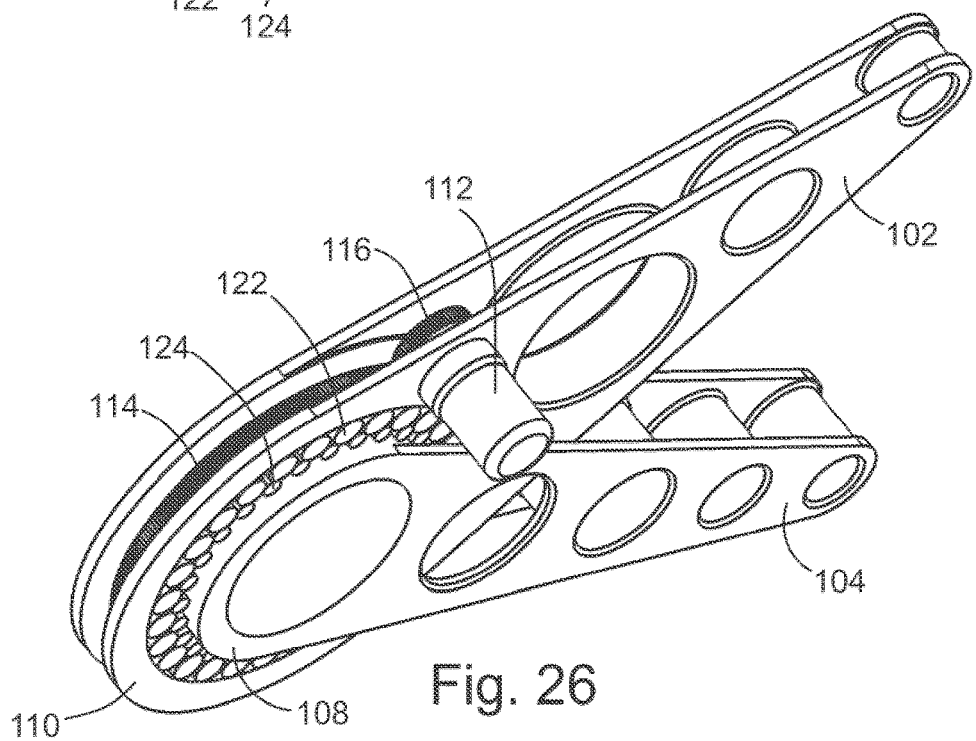
FIG. 26 shows an alternative view of the geared input drive of FIG. 25 with a pinion.

FIG. 26 shows input drive motor 112 with a pinion 116 is preferably geared (but a traction drive pinion would also work in some applications) to an input drive ring 114.

Figure 27:
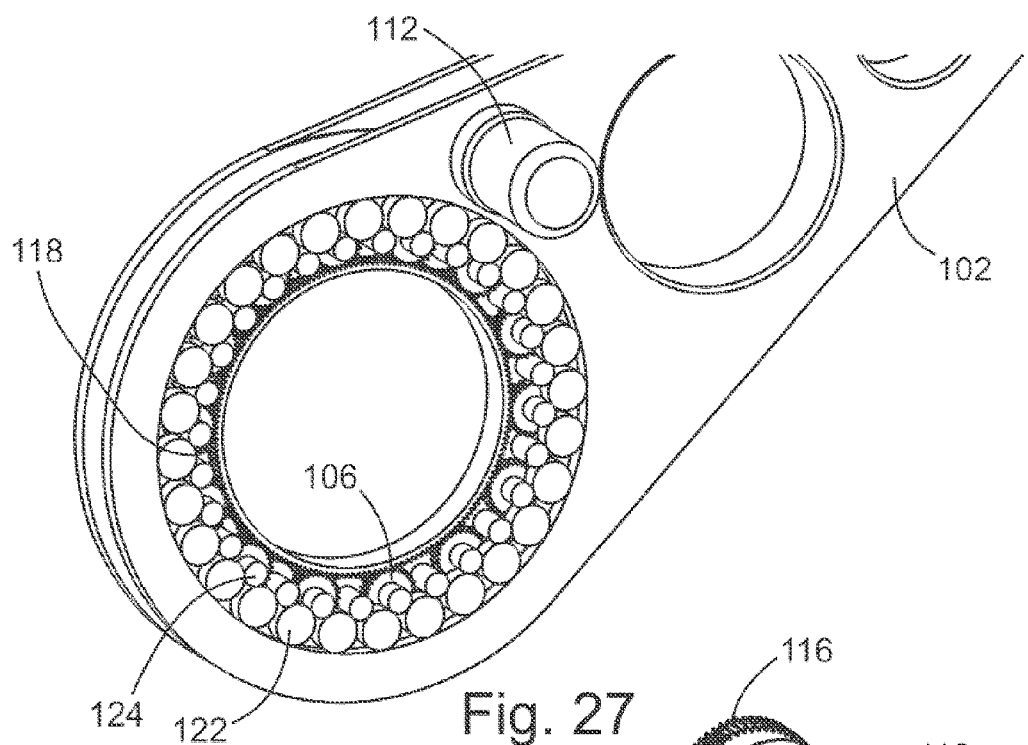
FIG. 27 shows an embodiment of a speed change device with motor.
Figure 28:
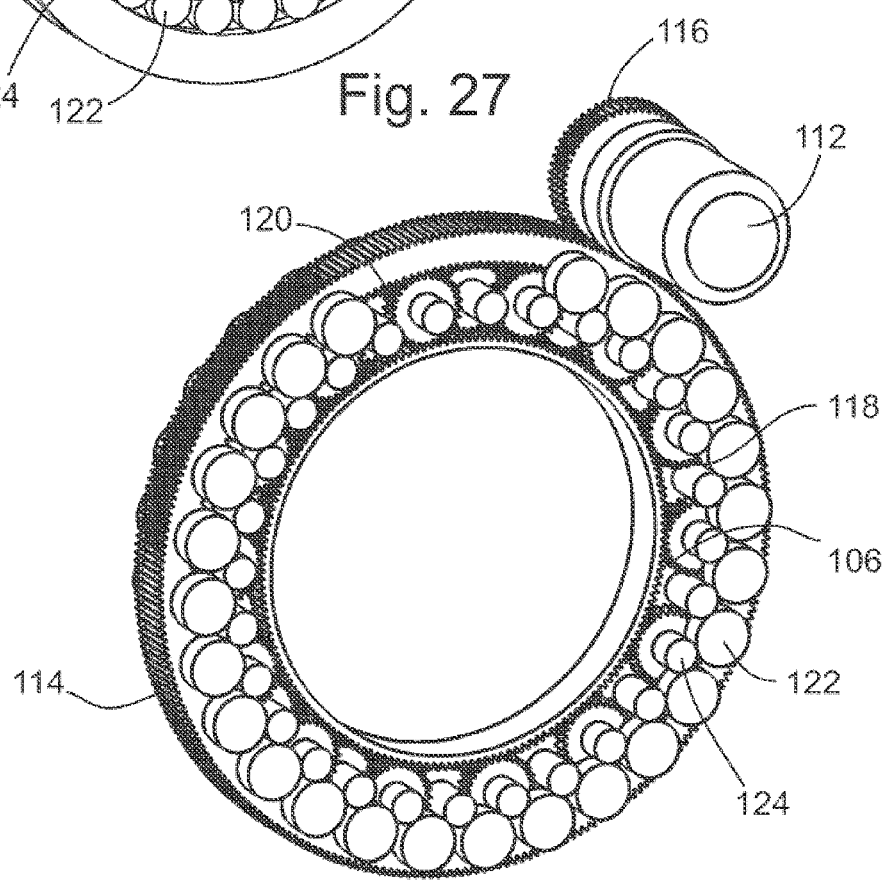
FIG. 28 is a cut-away view of the embodiment of FIG. 27.

Referring to FIGS. 27 and 28, the outer input drive ring 114 has a geared surface 120 on the ID which is in mesh with one or more of the rollers in either the outer row 122 or preferably the inner row 124 of rollers. An inner geared ring 118 is also in mesh, with these roller gears and is analogous to a free spinning sun gear.

The inner geared ring 118 does not input any drive torque to the rollers but serves two other purposes. It provides angular spacing between the geared rollers without the need for a spacing cage, and it contributes to the angular alignment of the geared rollers.

Figure 29:
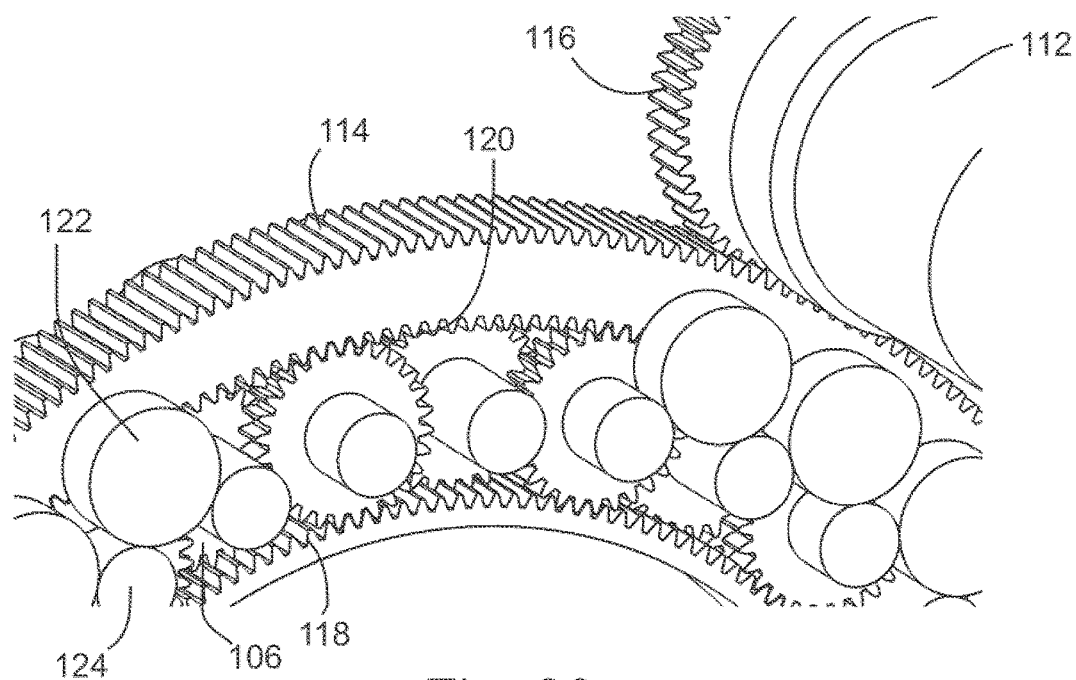
FIG. 29 is a first detail of gearing of the embodiment of FIG. 27.

Referring to FIG. 29, the geared surface 120 on the ID of the outer input ring, in combination with the free spinning sun gear ring 118, provides equal spacing between geared inner rollers as well as angular alignment for the geared rollers.

Figure 30:
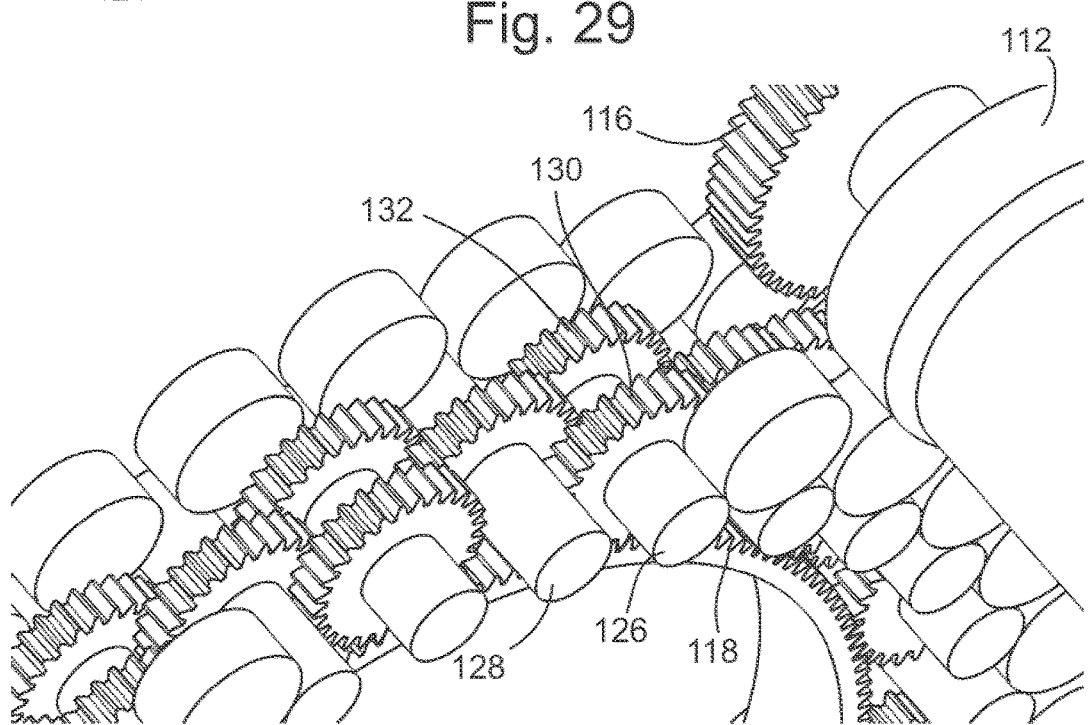
FIG. 30 is a second detail of gearing of the embodiment of FIG. 27

Referring to FIG. 30, every second geared roller 126 is preferably rigidly attached to two gear faces 130, one on either side of its center plane with the objective of getting these two gear faces as wide apart as practically possible with an the size constraints of the speed change device. The effect of this wide effective gear face is to provide a significant level of angular stability and alignment to these rollers when mashed together with the geared surface of the outer and inner geared rings.

Every first geared roller 128 preferably has only one gear 132 which is staggered with the double gears on every second roller to allow for the largest possible diameter on these gears. This large diameter is preferable to provide another level of speed change in the device.

Figure 31:
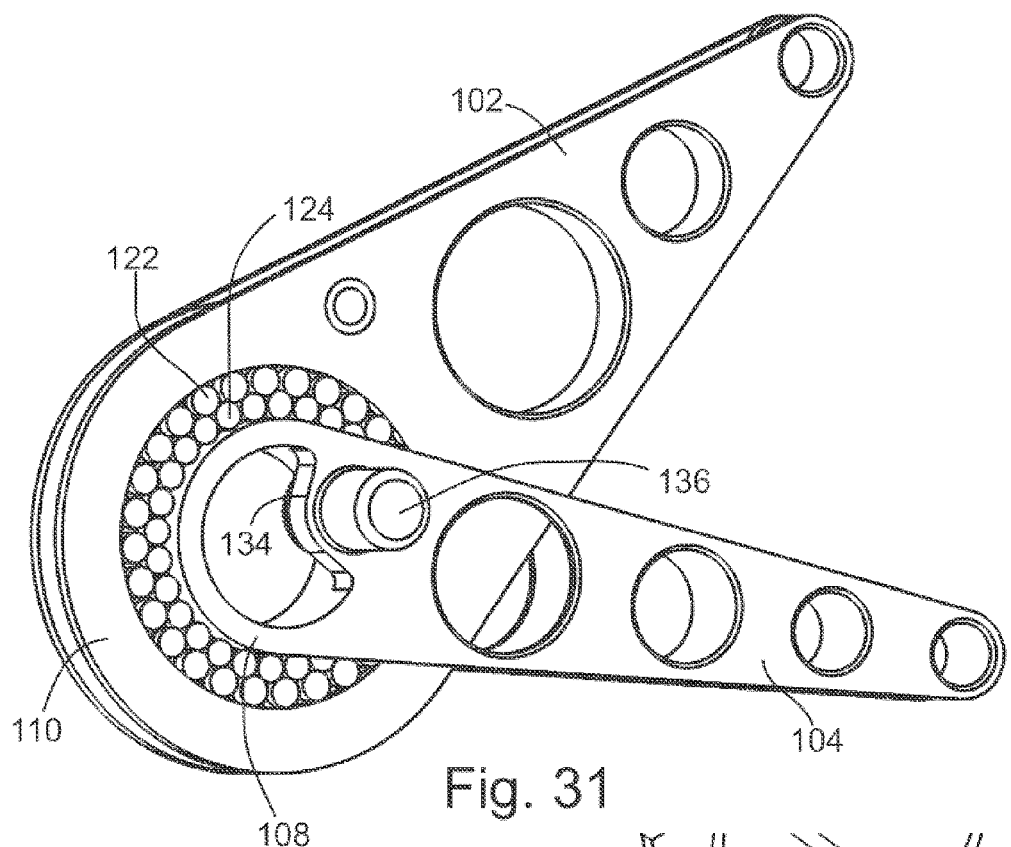
FIG. 31 shows an embodiment of a speed change device with fixed arm and output arm.
Figure 32:
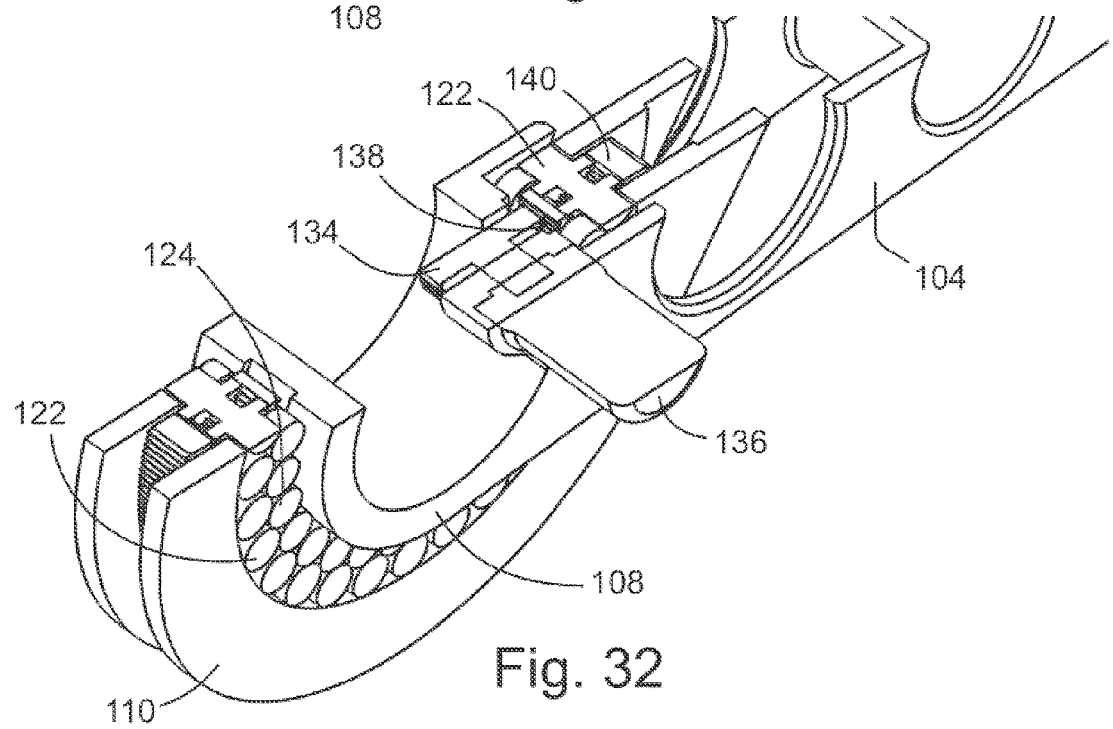
FIG. 32 shows a detail of the embodiment of FIG. 31.

Referring to FIGS. 31 and 32, an alternate embodiment uses a pinion drive 134 on the ID inner geared ring 138 with a free spinning outer gear ring 140. The geared rollers, in this configuration are preferably the outer row 122. One or more drive motors 136 and/or 112 and pinions 134 and/or 116 in the previous embodiment can be used together or individually for increased power and or to reduce or eliminate backlash on the geared input to the rollers.

Note: axial alignment features are not shown in this and the previous simplified exemplary illustrations. One or more of the axial and/or angular alignment systems disclosed elsewhere at this document may be used in combination with the geared input configuration shown in this section.

With a high enough "camming angle", traction camming is no long possible with common rigid materials (and will, for this geared embodiment description of the present speed change device, be referred to as the contact angle). By using a gear contact angle that is larger than the inner gear-roller contact angle, but smaller than the outer gear-roller contact angle with the outer ring, it will cause the inner roller/ring gear tooth mesh to separate when load is applied. With a full complement of gear-rollers with enough backlash to allow relative radial movement of the inner gear-rollers toward the outer gear rollers (but a small enough amount of backlash to maintain adequate tooth contact, the inner gear-rollers will separate, from the inner ring rolling contacts to the point where the gear teeth of each inner gear-roller gear teeth will come into contact, with the gear teeth of the adjacent outer gear-roller.

Due to the fact that the inner rollers will be loaded toward the adjacent outer rollers with a relatively small radial force, this floating inner roller effect is believed by the inventor to allow the inner roller in each roller set to find a radial position where the forces acting on it will be balanced by the forces acting on the adjacent set, such that the gear tooth load on all rollers will be very consistent, allowing a high number of gear teeth to share the applied torque load.

An additional factor which will needs to be considered is the effect of the separation force of the outer or inner drive ring gear (outer shown here as an example in a solid line, inner drive ring shown as a broken line). If the outer ring gear has too high of a contact angle, the separation force, will push the inner gear-roller against the inner race and it will no longer float. If the contact angle of the outer ring (in this example) is too low, the inner rollers will all find then best fit position to share the tooth loading consistently but the outer ring will not contact the gear-roller drive gear teeth consistently.

For a traction drive system, as shown in the computer-aided design (CAD) model of the gear roller embodiment of the present speed change device on the following pages, the traction, on the largest diameters of the inner roller (in this example, will preferably allow the inner rollers to move radially and still maintain traction).

The contributing factors to determining the best gear contact angle for the outer for inner) input gear ring are complex and will require some experimentation to determine the best balance of gear separation forces, manufacturing precision, centrifugal force on the inner rollers, etc.

FIGS. 33 to 43 show simplified models of the geared system, showing the inner race 38 with geared rings 156 on the OD of the inner race, and outer race 36 with geared rings 158 on the ID of the outer race, and inner geared, rollers 152 and outer geared rollers 154, according to the principles of the present speed change device described on this page. FIGS. 33-43 also show an embodiment with split outer races and split inner races.

Note: A geared speed change system according to present device using gear-rollers with two different pitch diameters 160 and 162 for the inner rollers and/or outer rollers to create a compound gear-roller arrangement is possible and similar to that shown in another section of this document and described as compound and semi-compound traction roller configurations of the present speed change device except that one or more of the traction, surfaces on the rollers and or races are replaced with geared surfaces.

Figure 33:
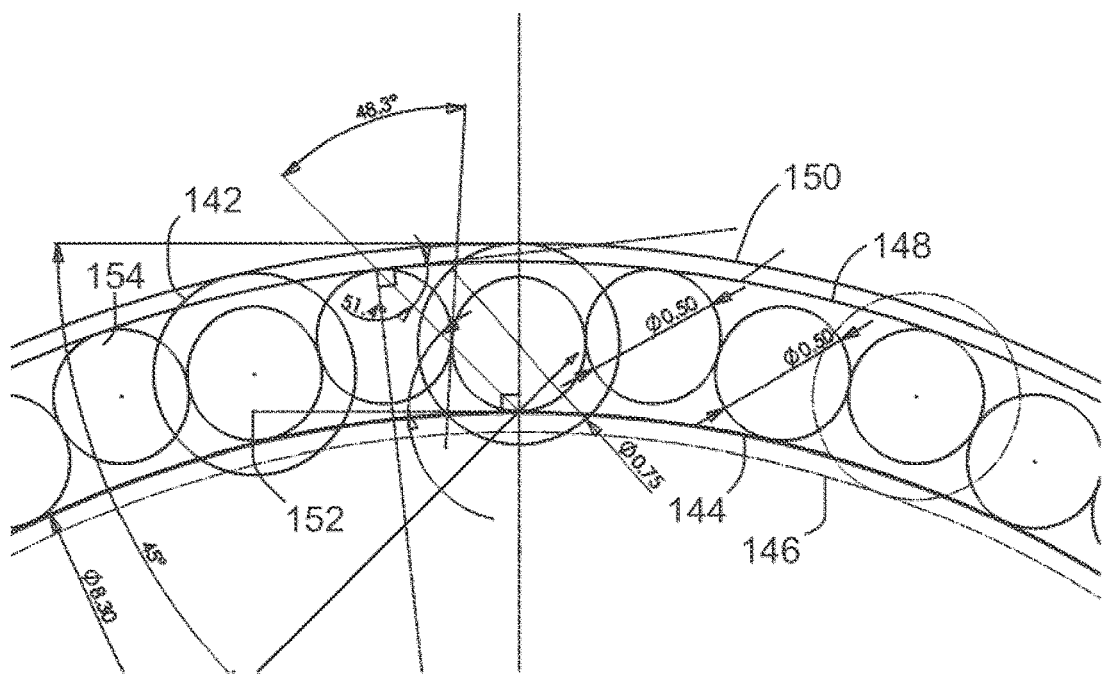
FIG. 33 shows principles of operation of a gearing system.

FIG. 33 is a schematic illustration of an example of a geared LiiveDriive configuration. Gear teeth not shown. Outer or inner drive input rings can be traction drive instead of geared for higher speed operation. Apart from that option, all contacts in this schematic are geared contacts. The example geared configuration comprises roller/roller contact angle 48.3 degrees, outer gear-roller contact angle 51.4 degrees, drive ring contact angle 45 degrees, inner roller contact angle 45 degrees, drive gear on inner rollers 142, inner gear ring pitch circle 144 (inner gear-rollers shown slightly separated from inner ring), alternate inner drive ring and outer roller gear 146, outer ring pitch circle 148, outer drive ring pitch circle 150 (inner drive ring may also be used), inner gear rollers 152 and outer gear rollers 154.

Figure 34:
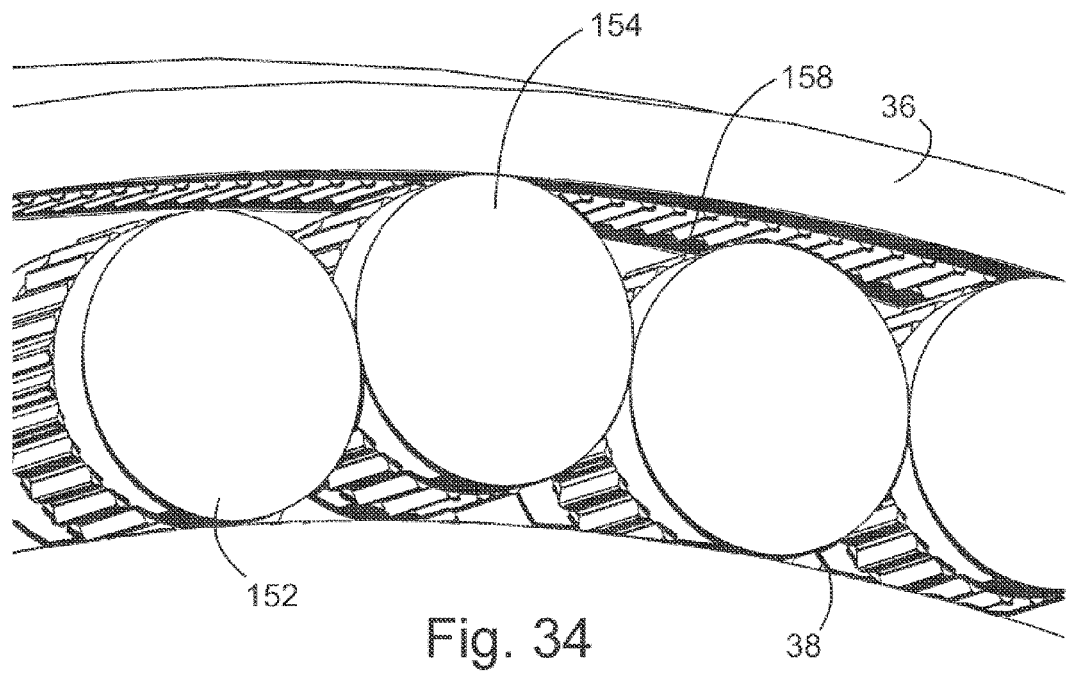
FIGS. 34-43 show various views of geared rollers and races.
Figure 35:
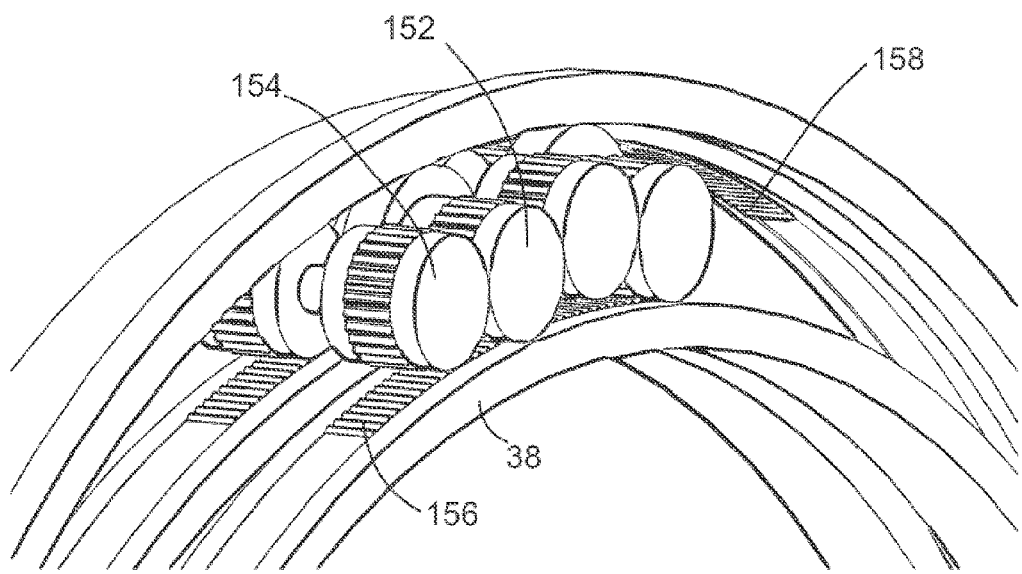
Figure 36:
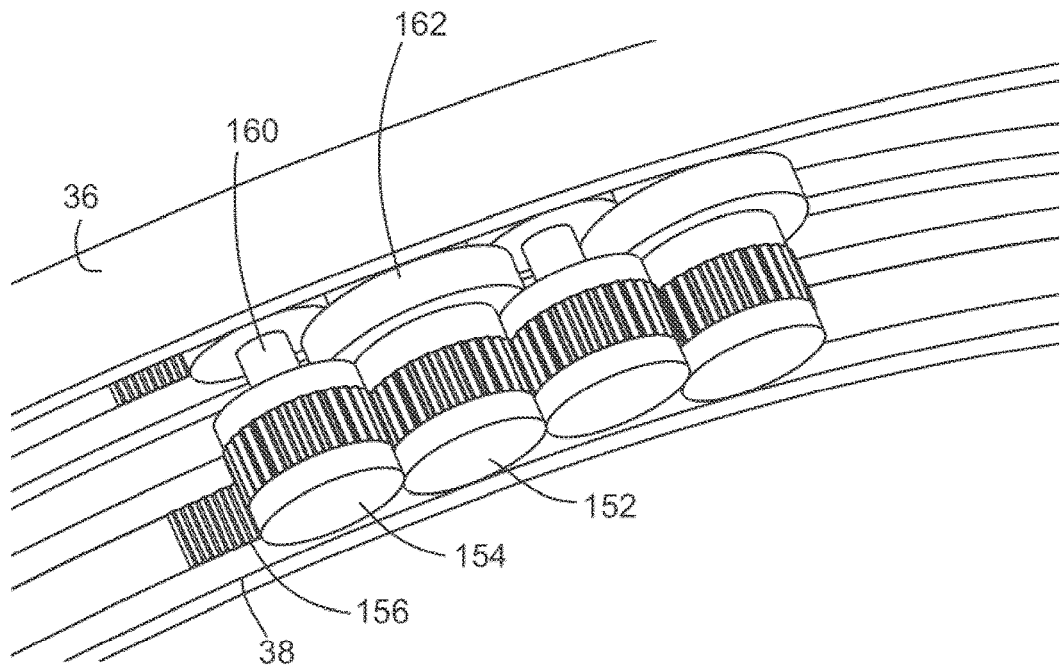
Figure 37:
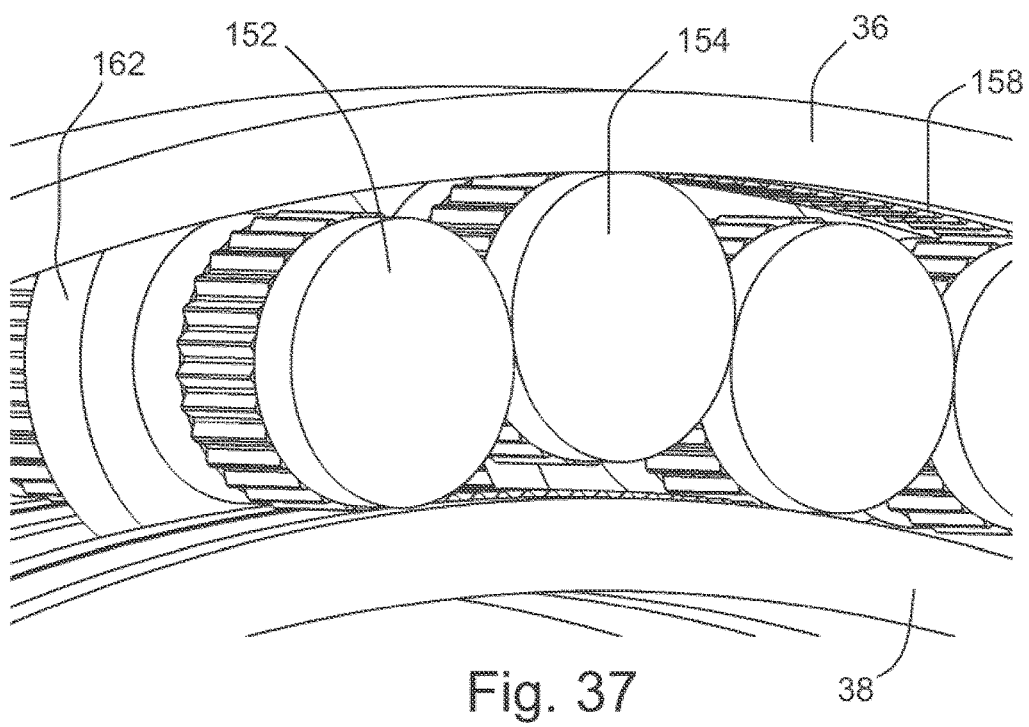
Figure 38:
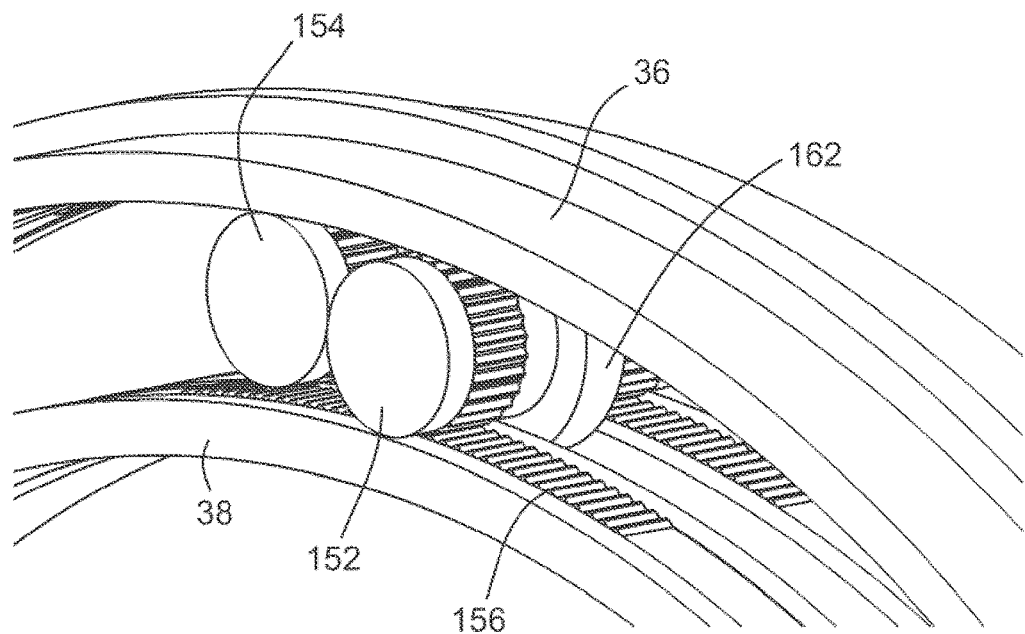
Figure 39:
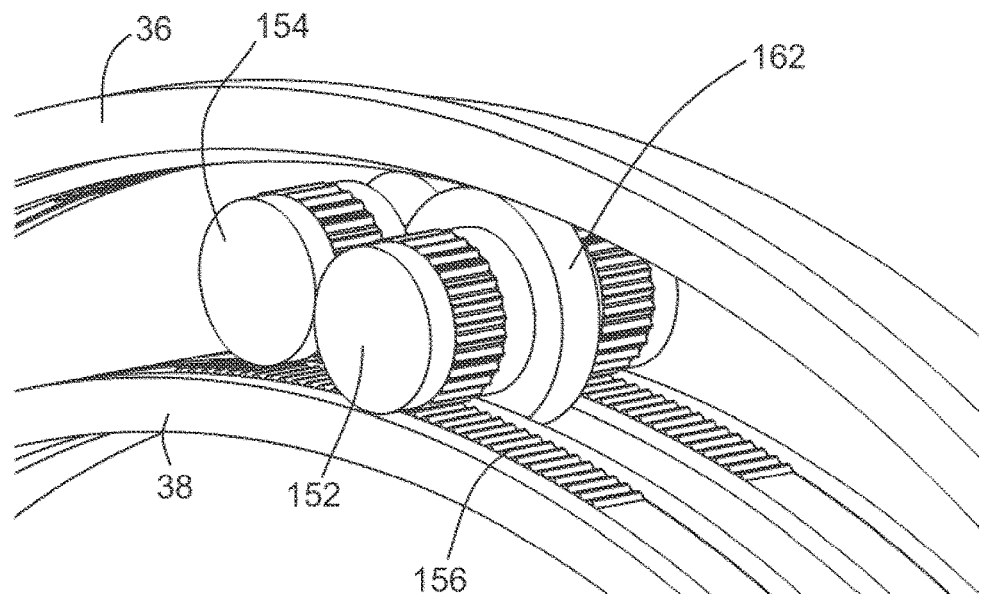
Figure 40:
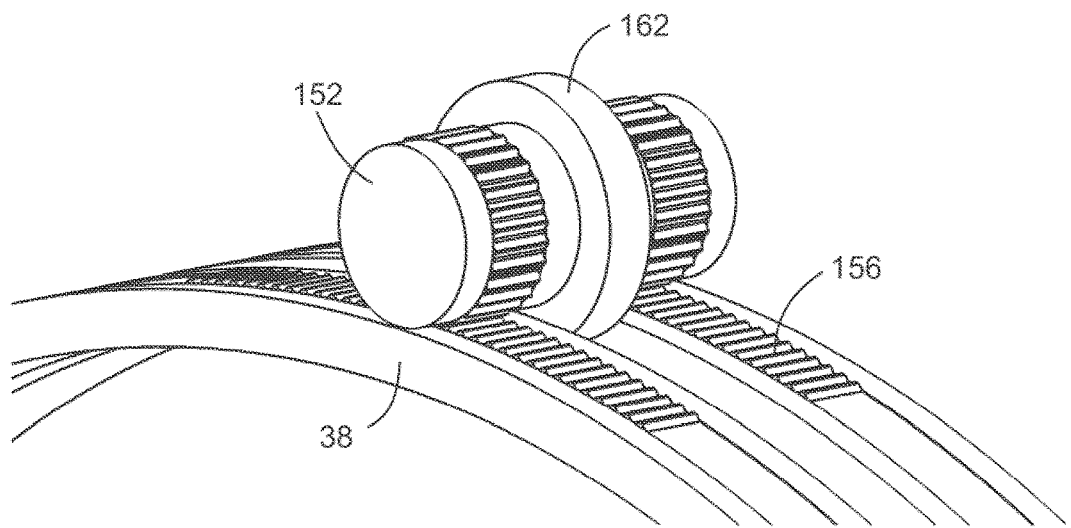
Figure 41:
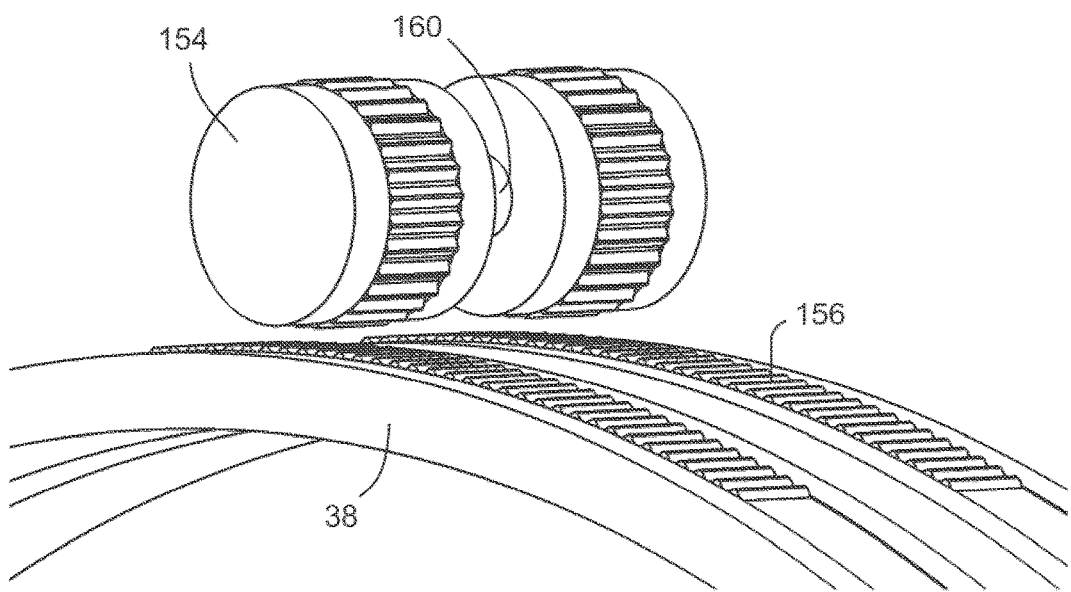
Figure 42:
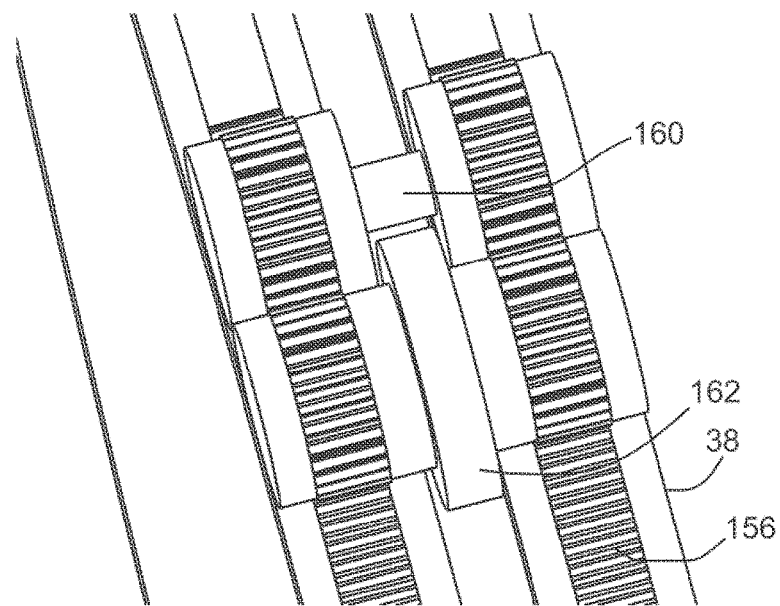
Figure 43:
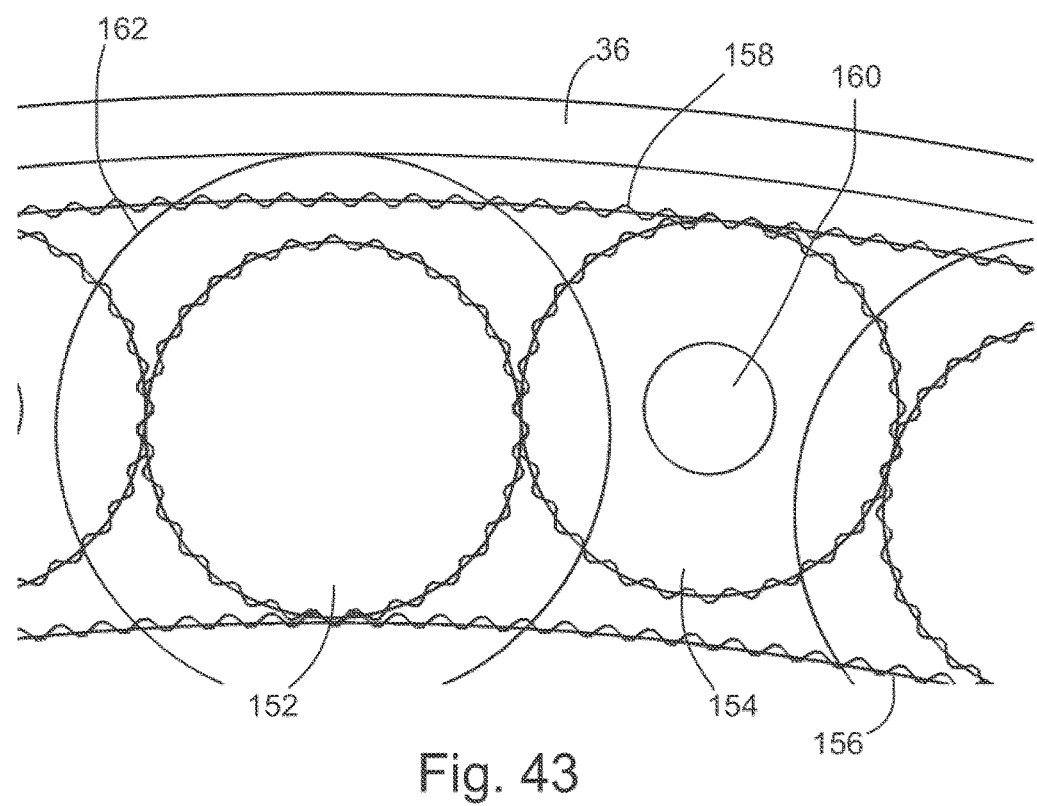

FIG. 34 shows a 2D CAD drawings of a preferred geometry for a geared configuration of the present speed change device.

Examples of Other Embodiments of the Present Speed Chance Device

Figure 44:
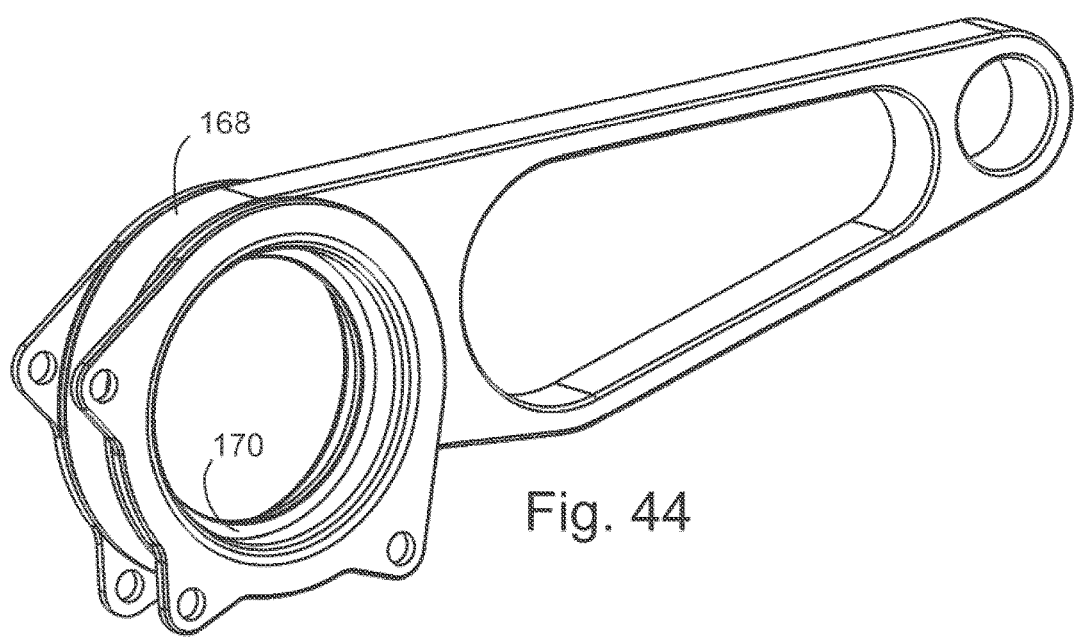
FIGS. 44-50 show an example of a thru-hole, high torque actuator using an embodiment of a speed change device.
Figure 45:
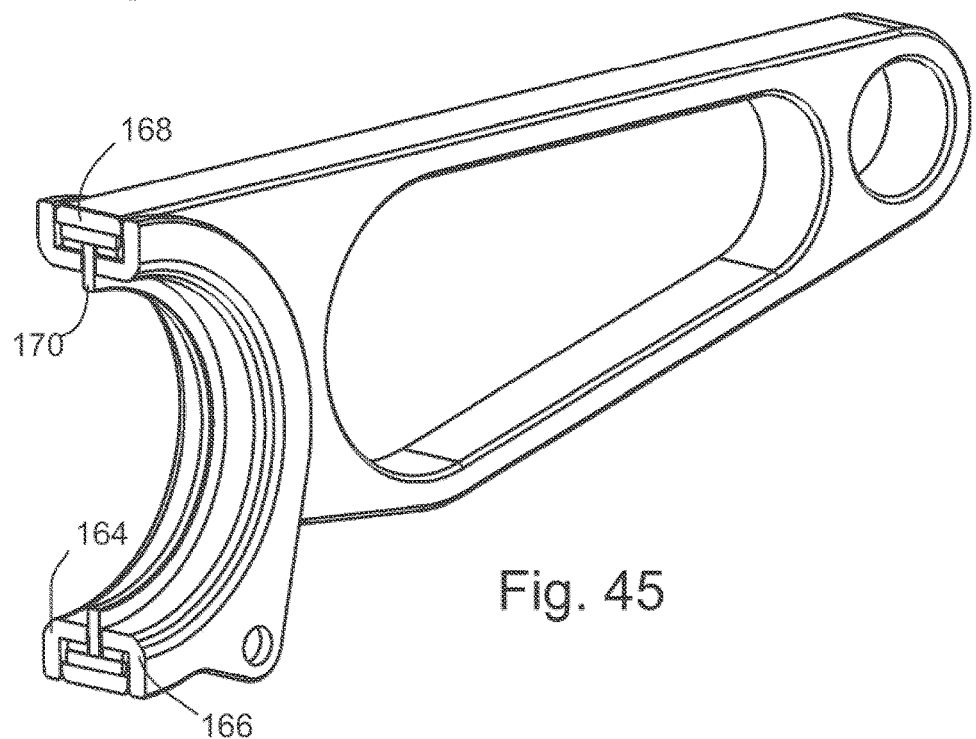
Figure 46:
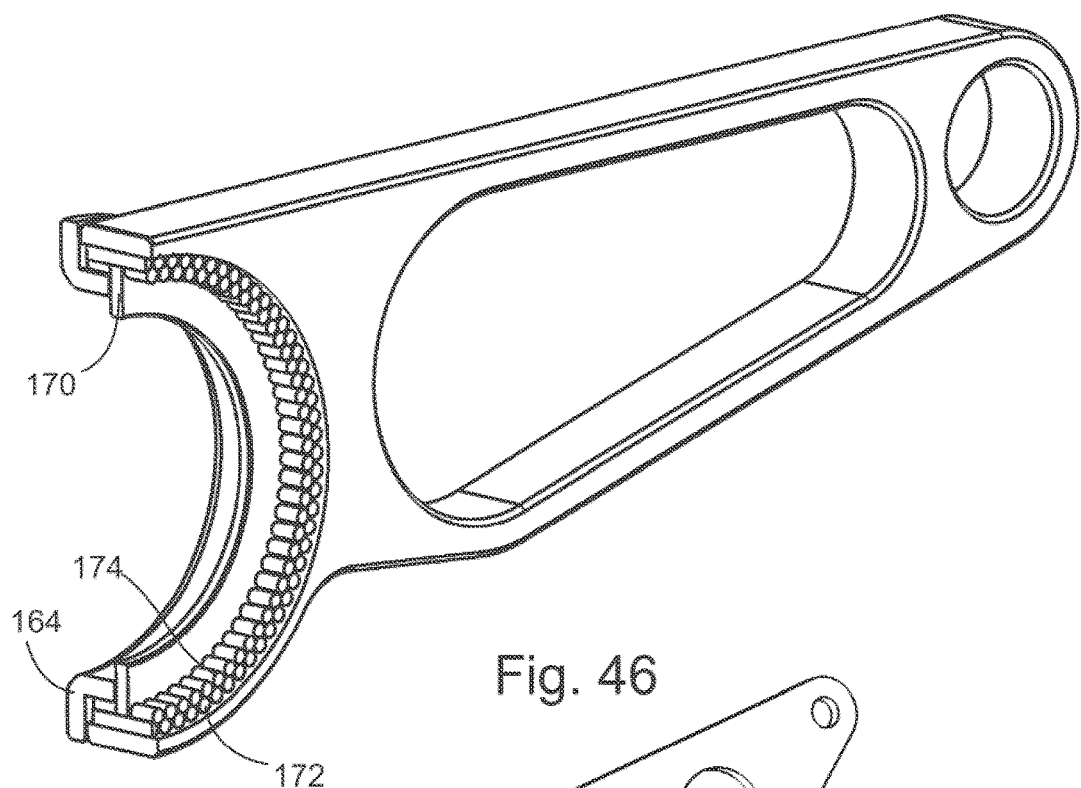
Figure 47:
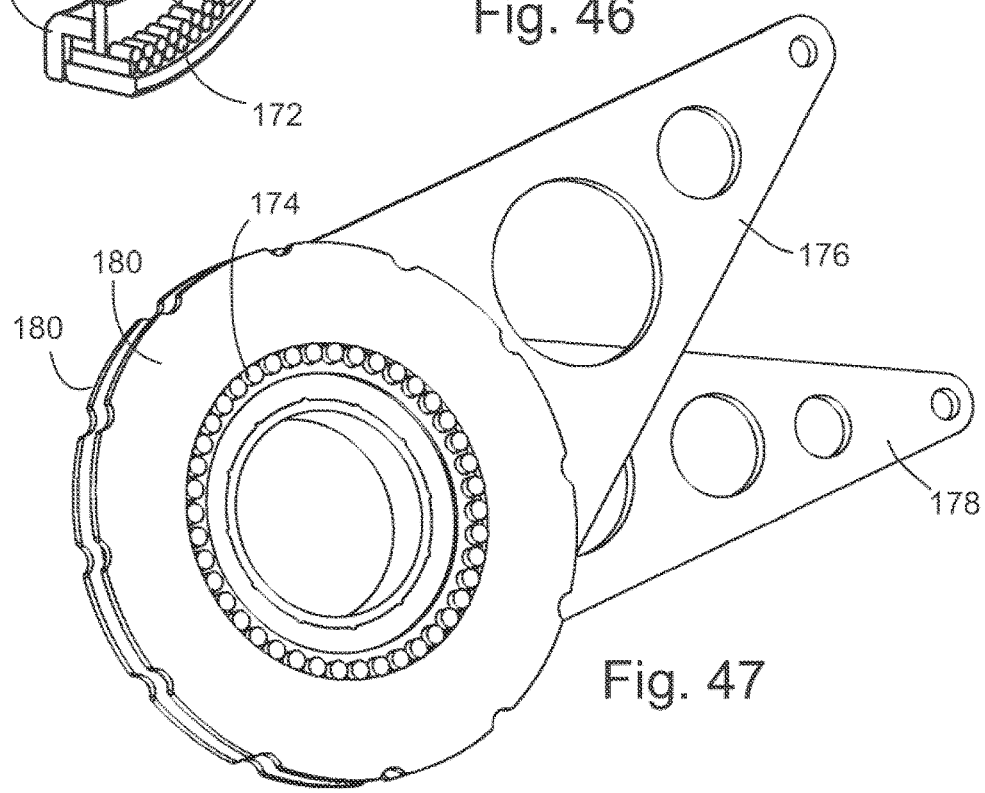

FIGS. 44-46 show an examples of a very large thru-hole, high torque actuator using an embodiment of the present traction speed change device. This embodiment uses a two-part inner race 164 and 166 and a single outer race 168. A single traction (or geared) input ring 170 provides the input torque.

First Plastic Prototype

Here is example of the first prototype of the change device winch was constructed out of plastic with a compressive strength of 12,000 PSI for the rollers and races and input rings, and aluminum for the fixed and output arms.

It has an inner race OD of 4.9" and an input and output race width of 0.25", By selecting a material combination with a coefficient of friction, above 0.34, an output torque of 60 foot pounds was achieved without damage or slipping.

Figure 48:
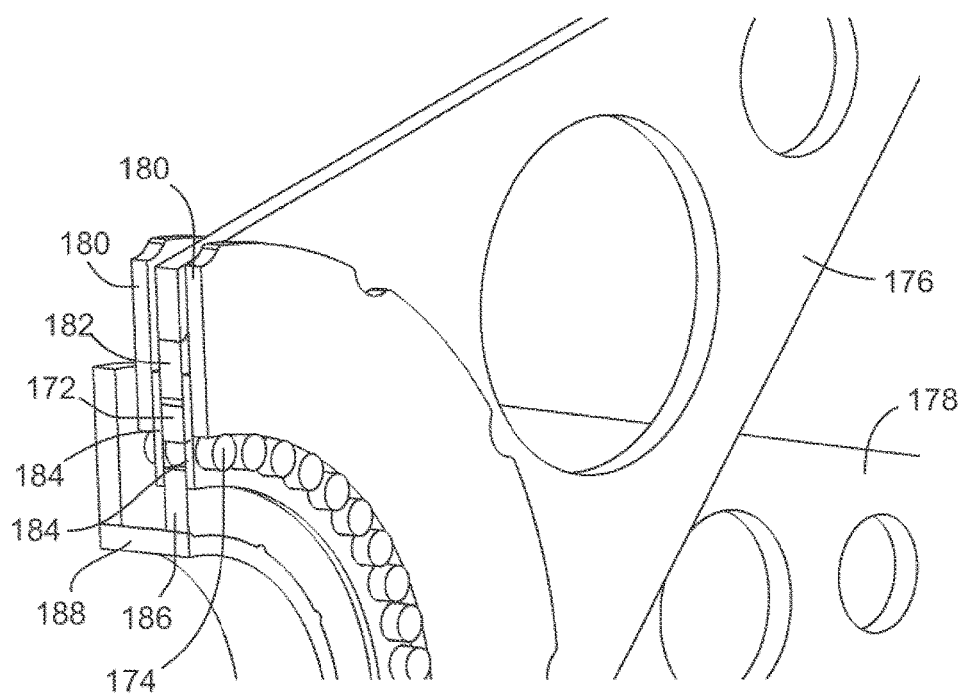
Figure 49:
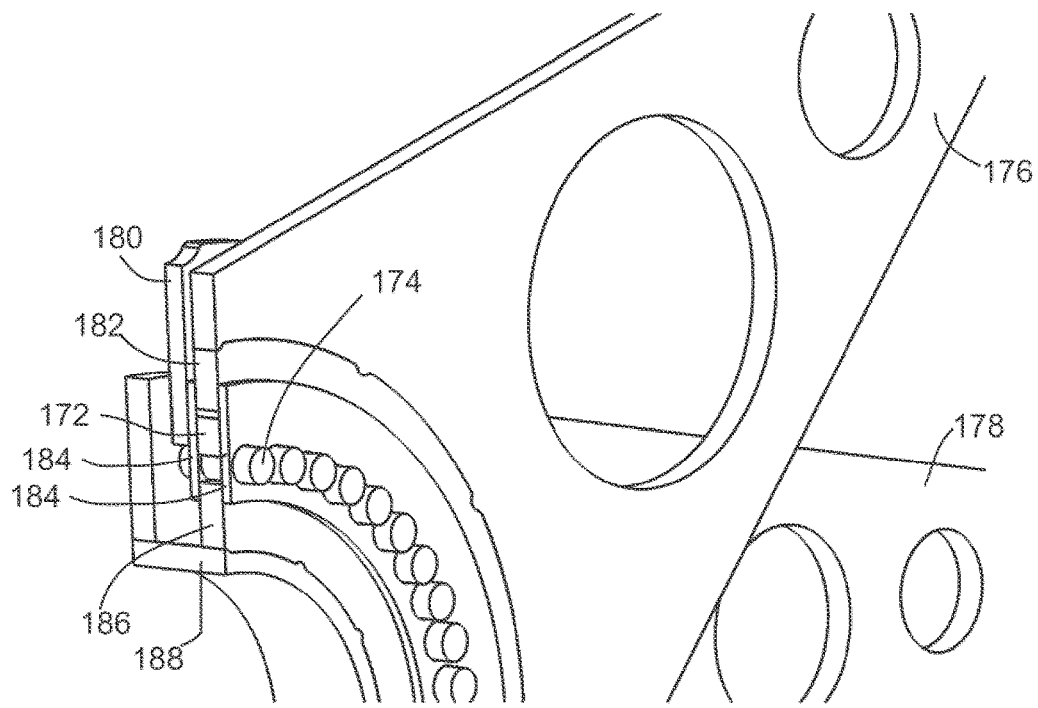

FIGS. 47-52 show examples of the CAD models for this prototype in various states of disassembly, including output arm 176 and fixed arm 178. In FIG. 48, dual input rings 180 spin and cause inner rollers 174 to roll along inner race, outer rollers 172 are the same width as the outer race 182 and inner race 186, inner rollers are the width of the races plus the two cage members 184 and the two input members 180. In FIG. 49, simplified UHMW cage 184 achieves consistent annular spacing of the inner rollers 174.

Figure 50:
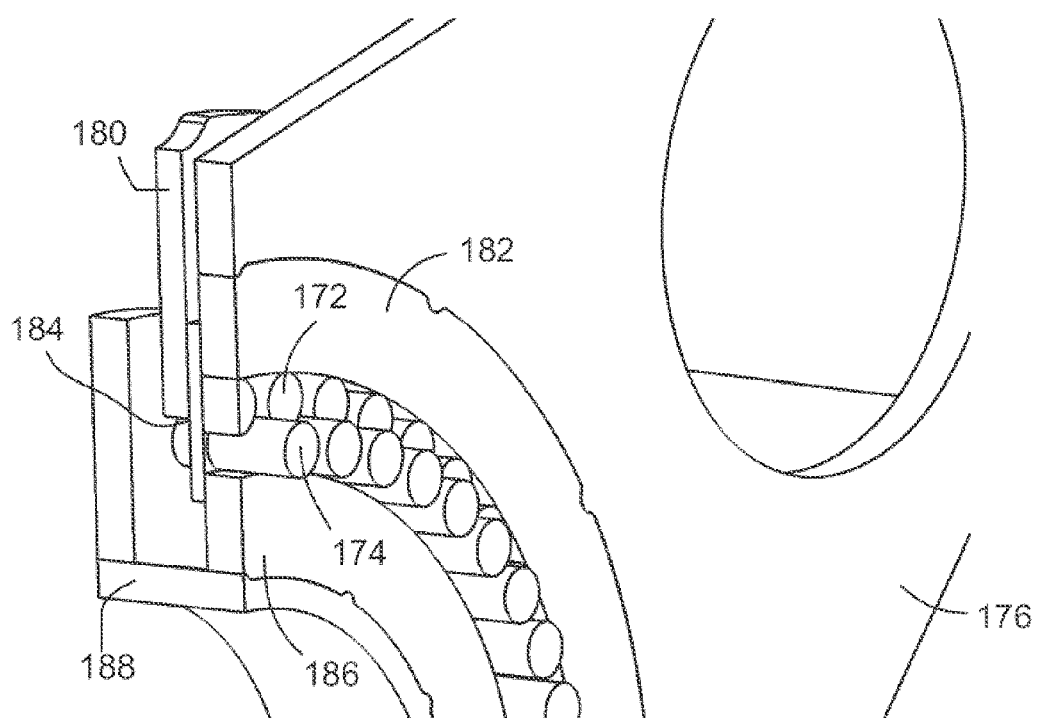
Figures 51, 52:
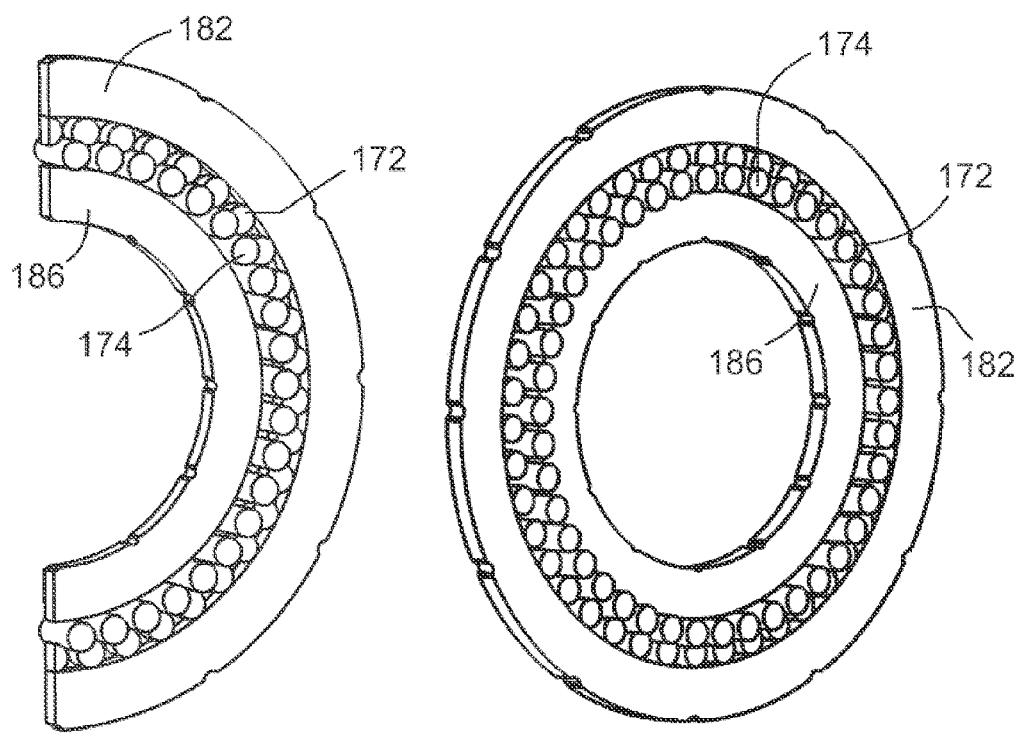
FIGS. 51-54 show various roller arrangements for embodiments of a speed change device.

In FIG. 50, an aluminum sleeve 188 is spline-fit to ID of inner race 186 and ID of fixed arm thru-hole. FIGS. 51 and 52 show the inner race 186, outer race 182, inner rollers 176, and outer rollers 172.

Figure 53:
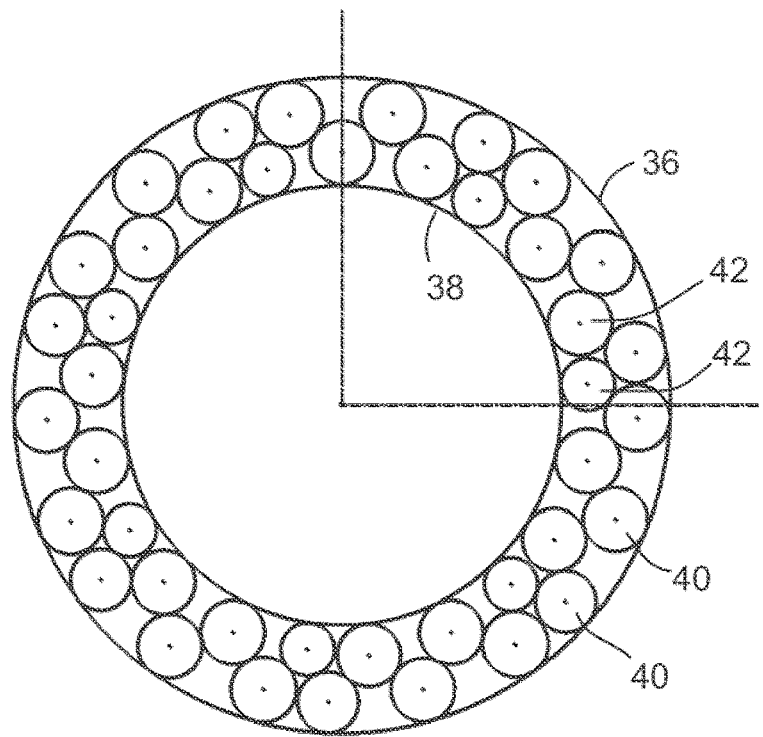

FIG. 53 shows an example of the present device where the rollers 42 in the inner row are more than one diameter. FIG. 52 also shows an example of the present device where the rollers 40 in the outer row are more than one diameter.

The present device with rollers of the inner and or outer row spaced closely together may be advantageous in certain applications. The closer the rollers are to the adjacent rollers in the same row, the lower the traction angle possible for certain geometric relationships between inner roller diameter, outer roller diameter, race diameter and the number of roller sets.

Another advantage of closely spaced rollers, for certain applications, is the potential to eliminate the need for a circumferential spacing means. When the rollers are equally spaced, it takes very little force to keep them at that spacing relative, to the other rollers in the same row. So if a roller material is used which has a lower CF against itself than it does against the other row of roller and against the race it is in contact traction with, then in some applications, it is preferable to allow closely spaced rollers to contact adjacent rollers in the same row if they become unequally spaced. Material combinations which exhibit these frictional properties include, but are not limited to, for example, spinodal bronze or beryllium bronze against itself and against steel.

For the present speed change device, if a material combination is used whereby the outer rollers exhibit a lower coefficient of friction when sliding against the adjacent outer rollers as compared to a higher coefficient of friction between the outer rollers and the enter race, the preferred average maximum gap for some applications and material combinations will be 0.01" or less immediately after assembly.

Larger gaps between the outer rollers may still work in this configuration for some applications, but are believed to be impractical if no other spacing elements are used.

FIG. 54 shows an example of inner rollers 42 and outer rollers 40 contacting or nearly contacting. It is preferable that only the inner or only the outer rows of rollers are near contacting or contacting according to the description above.

FIGS. 55-59 are examples of five configurations of the present speed change device at a single stage reduction with an additional input ring to provide rotational torque and motion to either the inner row of rollers 42 or outer row of rollers 40.

Each of these schematic representations of the present speed change device is shown with an accompanying mathematical formula which provides the basis for determining the speed change ratio and output speed rotation relative to the input ring rotation direction of each configuration. For each of these equations a negative result indicates the inner race rotating the opposite direction of the input ring. For clarity of explanation, all of the configurations shown in FIGS. 55-59 referred to here are presented with the outer race (or fixed lace) 36, the input ring 190 and the inner race (or output race) 38 as the rotating output.

It is possible, and in some cases preferable, according to the principles disclosed in this document, to combine one or more stages as described in the following drawings and other examples of configurations in this document.

Figure 55:
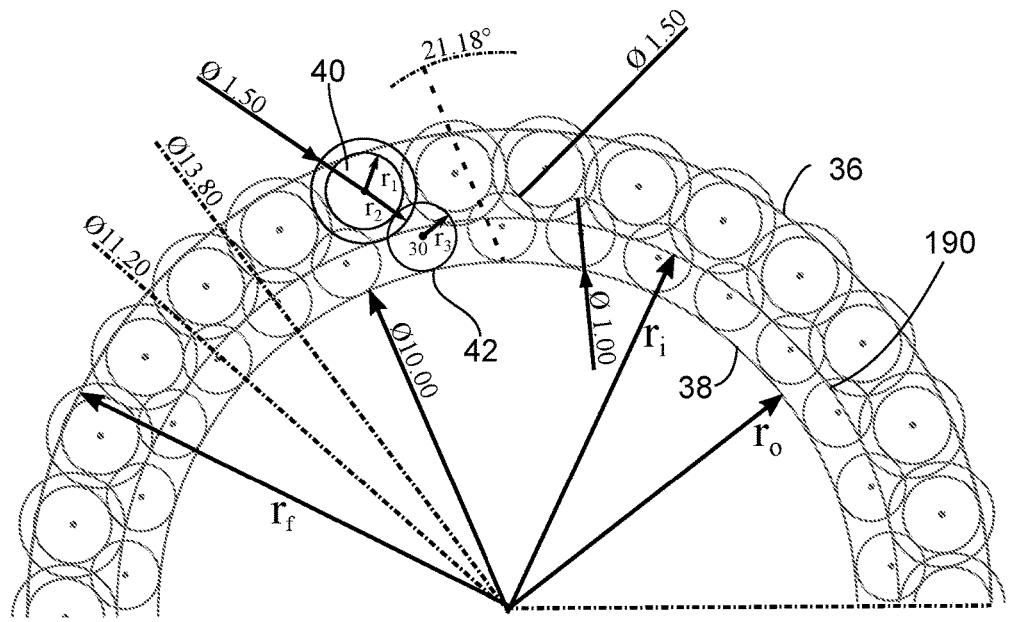
FIGS. 55-59 show examples of five configurations of an embodiment of a speed change device as a single stage reduction.

FIG. 55 shows an example of a first configuration. Equations (4)-(6) provide the basis for determining the speed change ratio and output speed rotation relative to the input ring rotation direction of the first configuration. The input roller rotates at same speed as output roller.

$$\frac{\omega_o}{\omega_i} = -\frac{e_1(e_2-1)}{(e_1-1)} \quad (4)$$

$$e_1 = -\frac{r_1}{r_f} \times \frac{r_i}{r_2} \quad (5)$$

$$e_2 = \frac{r_f}{r_o} \quad (6)$$

Figure 56:
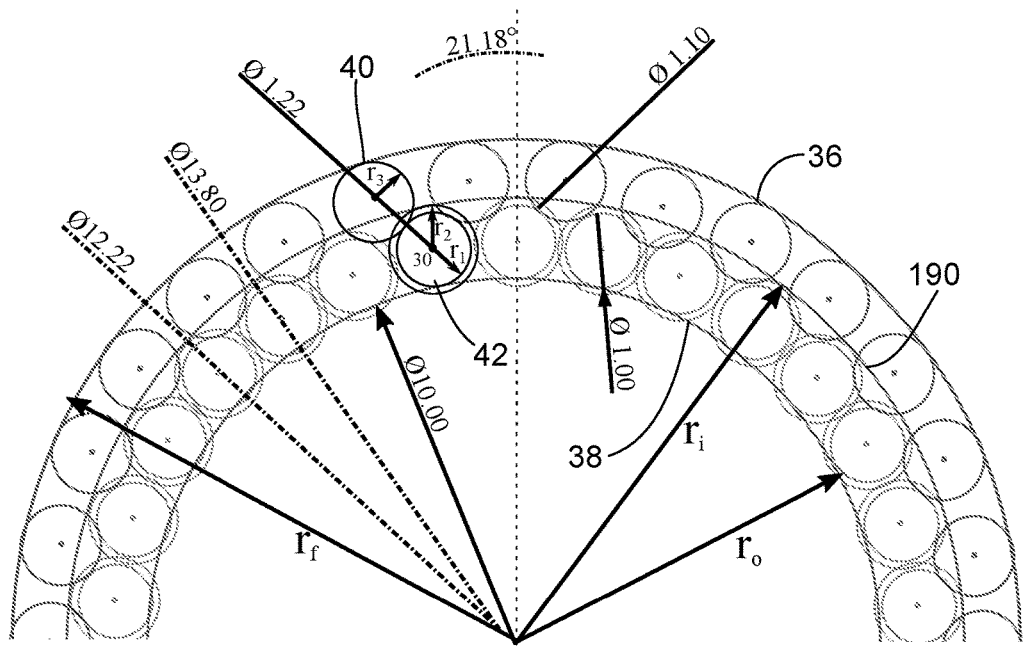

Where:
$\omega_o$=output angular velocity
$\omega_i$=input angular velocity
$r_f$=fixed race diameter
$r_4$=input ring diameter
$r_0$=output race diameter
$r_2$=input roller diameter
$r_1$=output roller diameter
$r_3$=idler roller diameter FIG. 56 shows an example of a second configuration. Equations (4), (7) and (8) provide the basis for determining the speed change ratio and output speed rotation relative to the input ring rotation direction of the second configuration.

$$\frac{\omega_o}{\omega_i} = -\frac{e_1(e_2-1)}{(e_1-1)} \quad (4)$$

$$e_1 = \left(\frac{r_i}{r_1} \times \frac{r_2}{r_f}\right) \quad (7)$$

$$e_2 = \frac{r_f}{r_o} \quad (8)$$

Figure 57:
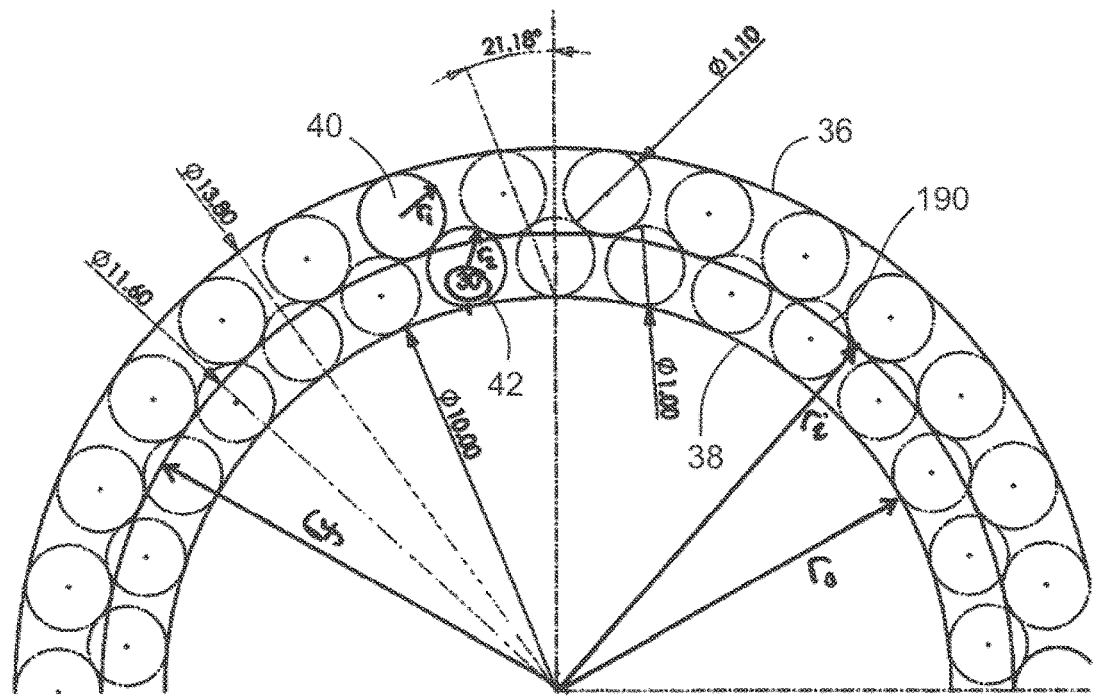

Where:
$\omega_o$=output angular velocity
$\omega_i$=input angular velocity
$r_f$=fixed race diameter
$r_4$=input ring diameter
$r_0$=output race diameter
$r_2$=input roller diameter
$r_1$=output roller diameter
$r_3$=idler roller diameter FIG. 57 shows an example of a third configuration. Equations (4), (9) and (10) provide the basis for determining the speed change ratio and output speed rotation relative to the input ring rotation direction of the third configuration.

$$\frac{\omega_o}{\omega_i} = -\frac{e_1(e_2-1)}{(e_1-1)} \quad (4)$$

$$e_1 = -\frac{r_1}{r_f} \quad (9)$$

$$e_2 = \frac{r_f}{r_o} \quad (10)$$

Figure 58:
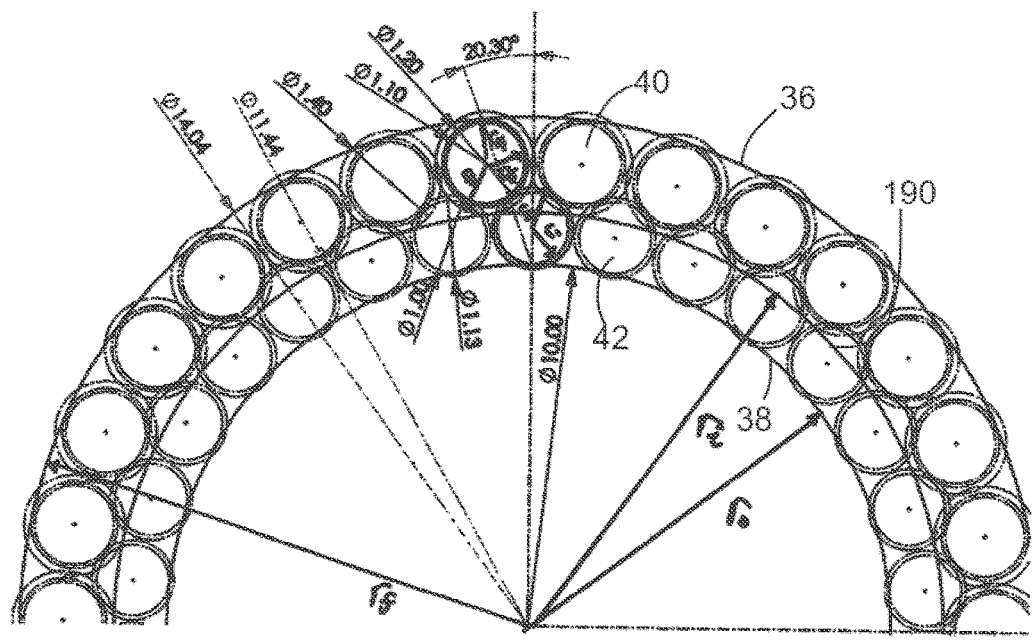

Where
$\omega_o$=output angular velocity
$\omega_i$=input angular velocity
$r_f$=fixed race diameter
$r_4$=input ring diameter
$r_0$=output race diameter
$r_2$=input roller diameter
$r_1$=output roller diameter
$r_3$=idler roller diameter FIG. 58 shows an example of a fourth configuration. Equations (4), (11) and (12) provide the basis for determining the speed change ratio and output speed rotation relative to the input ring rotation direction of the fourth configuration. note: $\tau_4$ does not contact $\tau_1$.

$$\frac{\omega_o}{\omega_i} = -\frac{e_1(e_2 - 1)}{(e_1 - 1)} \quad (4)$$

$$e_1 = -\left(\frac{r_i}{r_3} \times \frac{r_4}{r_f}\right) \quad (11)$$

$$e_2 = \left(\frac{r_f}{r_4} \times \frac{r_5}{r_2} \times \frac{r_1}{r_o}\right) \quad (12)$$

Figure 59:
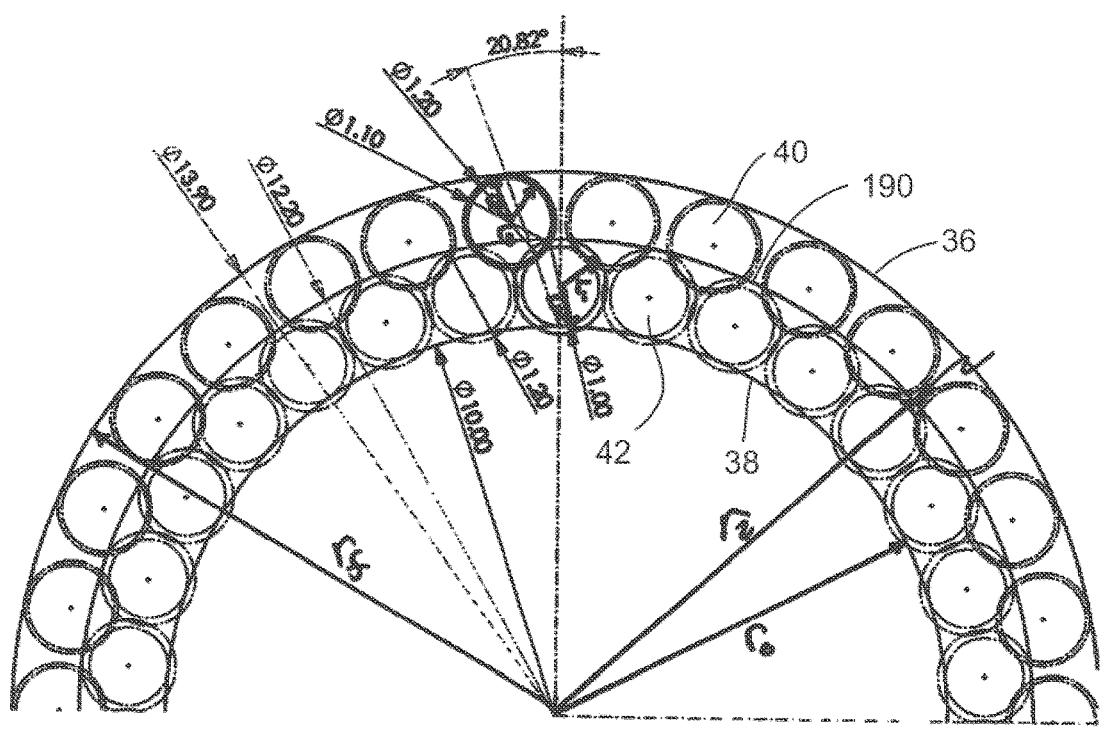

Where:
$\omega_o$=output angular velocity
$\omega_i$=input angular velocity
$\tau_f$=fixed race diameter
$\tau_4$=input ring diameter
$\tau_0$=output race diameter
$\tau_2$=input roller diameter
$\tau_1$=output roller diameter
$\tau_3$=idler roller diameter FIG. 59 shows an example of a fifth configuration. Equations (4), (13) and (14) provide the basis for determining the speed change ratio and output speed rotation relative to the input ring rotation direction of the fifth configuration.

$$\frac{\omega_o}{\omega_i} = -\frac{e_1(e_2 - 1)}{(e_1 - 1)} \quad (4)$$

$$e_1 = -\left(\frac{r_i \times r_2 \times r_4}{r_1 \times r_3 \times r_f}\right) \quad (13)$$

$$e_2 = \left(\frac{r_f}{r_4} \times \frac{r_3}{r_o}\right) \quad (14)$$

Figure 60:
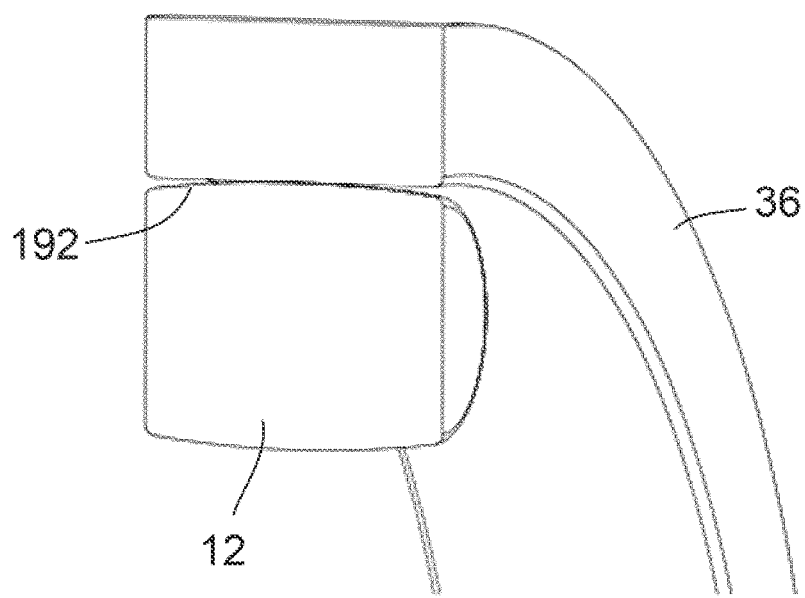
FIG. 60 shows an embodiment of a roller that tapers axially.

Where:
$\omega_o$=output angular velocity
$\omega_i$=input angular velocity
$\tau_f$=fixed race diameter
$\tau_4$=input ring diameter
$\tau_0$=output race diameter
$\tau_2$=input roller diameter
$\tau_1$=output roller diameter
$\tau_3$=idler roller diameter As shown in FIG. 60, any one of the rollers disclosed in this patent document may have nearly cylindrical traction surfaces 192 on the rollers 12 such that the surfaces are slightly smaller in diameter toward the axial ends of the roller traction surfaces to reduce Hertzian stress near the axial ends of the contact surfaces as shown in FIG. 60 schematically and not to scale. Similarly, the inner race 38 may have a slightly decreasing diameter towards its extremities in the axial direction, and the outer race 36 may have slightly increasing diameter towards its extremities in the axial direction. Any of the shown rollers may be hollow to allow for compressibility and enhance pre-loading. An example of a hollow roller is shown in FIGS. 15 and 24, also FIG. 62 (inner roller 224).

Figure 61:
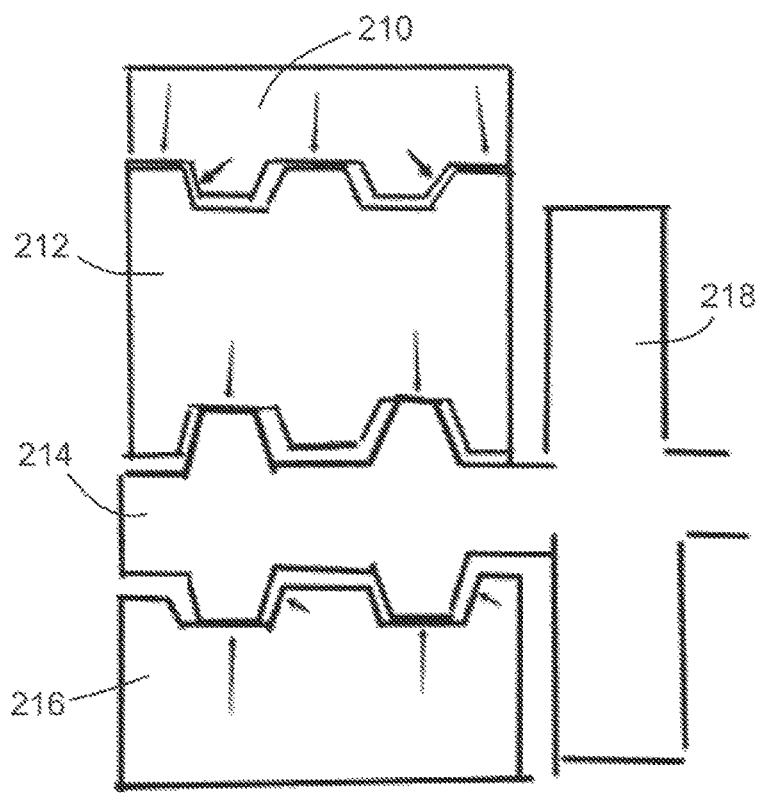
FIG. 61 shows a cross-section of an embodiment of a speed change devise with different torque transmitting diameters.

In FIG. 61, a speed change device is shown with outer race 210, outer roller 212 (in a set of outer rollers), inner roller 214, inner race 216, and output 218 (in a speed increaser embodiment, or input for a speed decreaser). Arrows in the section show traction contacts. The outer rollers 212 are compound with a larger diameter contacting the race 210 and a smaller diameter contacting the inner roller 214. The inner roller 214 has the same diameter contacting the inner race 216 and the outer roller 212.

Figure 62:
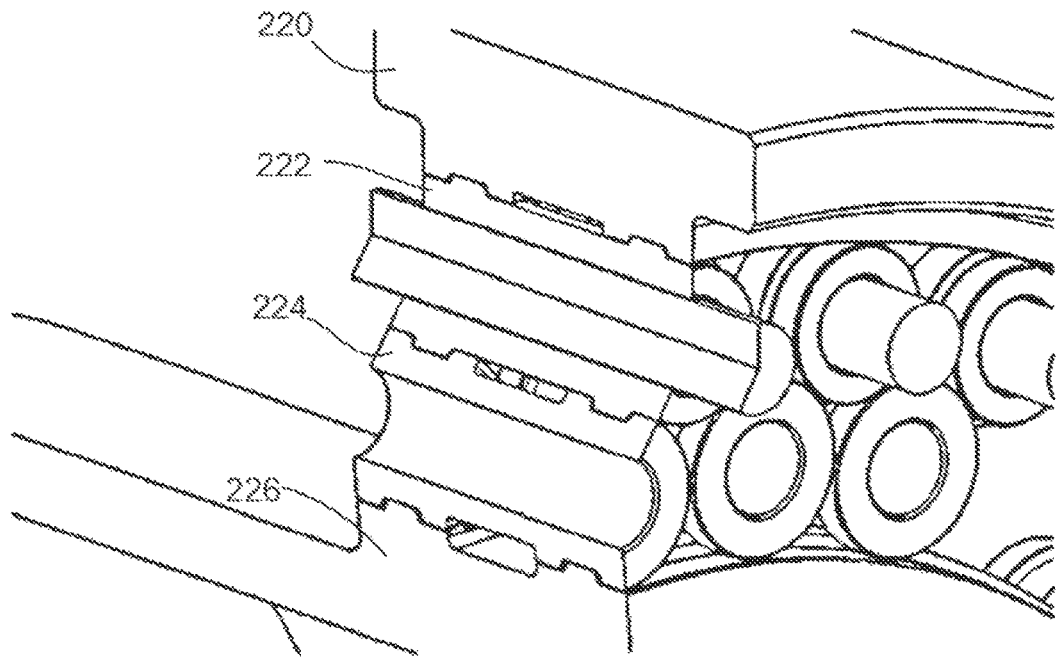
FIG. 62 shows a view, partly in section, of a further embodiment of a speed change device with different torque transmitting diameters.

In FIG. 62, a speed change device is shown with outer race 220, outer roller 222 (to a set of outer rollers). Inner roller 224 and inner race 226. In this embodiment, the outer rollers 222 have a larger maximum cylindrical surface diameter than the maximum cylindrical surface diameter of the inner roller 224 and the outer roller 222 has a larger diameter traction contact with the outer race 220 than with the inner roller 224, and the inner roller 224 has the same diameter contact with the outer roller 222 as the inner roller 224 contact with the inner race 226.

In the embodiment of FIG. 7 for example, contacts of each inner roller with the inner race and with the outer rollers that transmit torque all have the same torque transmitting diameter, and contacts of each outer roller with the outer race and with the inner rollers that transmit torque have a torque transmitting diameter and all the torque transmitting diameters are equal. However, in some embodiments the outer rollers may have a different diameter contact with the inner surface of the outer race, than the diameter of contact of the outer rollers with the inner rollers. In some embodiments, the outer rollers have a larger diameter primary torque transmitting contact with the inner surface of the outer race, than the diameter in primary torque transmitting contact with the inner rollers. In some embodiments, the outer rollers have a larger diameter primary torque transmitting contact with the primary torque transmitting contact inner surface of the outer race, than the primary torque transmitting contact diameter in contact with the inner rollers, and the inner rollers have the same primary torque transmitting contact diameter with the outer rollers as with the primary torque transmitting contact diameter of the inner race. Further in some embodiments, the inner rollers have larger diameter primary torque transmitting contact with the outer rollers and smaller primary torque transmitting contact with the outer surface of the inner race. In some embodiments, the outer rollers have two diameters and inner rollers have one diameter such that rotation of rollers causes orbiting of the rollers in one direction resulting in rotation of inner race in the same direction as roller orbit direction when the outer race is fixed. In some embodiments, the outer rollers have two diameters and the inner rollers have one diameter such that rotation of rollers causes orbiting of rollers in one direction resulting in rotation of the inner race in the opposite direction as the roller orbit direction when the order race is fixed. In some embodiments, the outer rollers have two diameters and inner rollers have two different diameters such that rotation of rollers causes orbiting of rollers in one direction resulting in rotation of inner race in the same direction as roller orbit direction when outer race is fixed. In some embodiments, the outer rollers have two diameters and inner rollers with two different diameters such that rotation of the rollers causes orbiting of the rollers in one direction resulting in rotation of the inner race in the opposite direction as the roller orbit direction when outer race is fixed.

In the claims, the word "comprising" is used in its inclusive sense and does not exclude other elements beam present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A speed change device comprising:
    an inner race having an outer surface;
    an outer race having an inner surface;
    a set of orbital rollers including inner rollers in rolling contact with the outer surface of the inner race and outer rollers in rolling contact with the inner surface of the outer race;
    each and every inner roller being in rolling contact with two outer rollers;
    each and every outer roller being in rolling contact with two inner rollers; and
    a geared input ring concentric with the inner race and the outer race, the geared input ring being in geared contact with one or more geared rollers of the set of orbital rollers, the one or more geared rollers also being in geared contact with a free spinning ring or the one or more geared rollers being inner rollers and the rolling contact of the one or more geared rollers with the outer surface of the inner race being geared contact or the one or more geared rollers being outer rollers and the rolling contact of the one or more geared rollers with the inner surface of the outer race being geared contact.

2. The speed change device of claim 1 in which each of the inner race and outer race are centered on an axis, and, for each pair of a first inner roller that contacts a first outer roller, where a traction angle ø is defined as the angle between a first line extending outward from the axis through a center of the first inner roller and a second line extending from the contact point of the first outer roller with the outer race and a contact point of the first inner roller with the inner race, and the first inner roller contacts the inner race with a first coefficient of friction cf1 and the first outer roller contacts the outer race with a second coefficient of friction cf2, cf1>tan(ø) and cf2>tan(ø).

3. The speed change device of claim 1 in which one or more of the set of orbital rollers are hollow.

4. The speed change device of claim 1 in which each inner roller is formed of two or more axially aligned roller sections.

5. The speed change device of claim 4 in which each outer roller is in contact with each roller section of each inner roller that the outer roller contacts.

6. The speed change device of claim 4 in which the outer rollers are longer than the inner rollers and the one or more geared rollers are outer rollers.

7. The speed change device of claim 6 in which the input ring has an outward facing surface and the outward facing surface is in geared contact with the one or more geared rollers.

8. The speed change device of claim 1 in which each outer roller is formed of a pair of axially aligned roller sections.

9. The speed change device of claim 8 in which each inner roller is in contact with each roller section of each outer roller that the inner roller contacts.

10. The speed change device of claim 8 in which the inner rollers are longer than the outer rollers and the one or more geared rollers are inner rollers.

11. The speed change device of claim 10 in which the input ring has an inward facing surface and the inward facing surface is in geared contact with the one or more geared rollers.

12. The speed change device of claim 1 integrated with a preliminary speed change stage.

13. The speed change device of claim 12 in which the preliminary speed change device with an integrated preliminary speed change stage using the self-energizing present speed change system such that camming of the rollers in the first stage increases the contact force of these rollers on the outer race of the first stage such that the outer race of the first stage can expand to transmit this increased radial force to the input traction surfaces on the rollers of the second stage.

14. The speed change device of claim 1 in which the inner rollers and the outer rollers are pressed together under a pre-load force within the races.

15. The speed change device of claim 1 in which the geared rollers are inner rollers.

16. The speed change device of claim 15 in which the geared input ring has an inner surface and the inner surface is in contact with the geared rollers.

17. The speed change device of claim 1 in which the geared rollers are outer rollers.

18. The speed change device of claim 17 in which the geared input ring has an outer surface and the outer surface of the ring is in contact with the geared rollers.

19. The speed change device of claim 1 in which the geared rollers are inner rollers.

20. The speed change device of claim 19 in which the geared ring is in geared contact with each inner roller.

21. The speed change device of claim 1 in which the geared rollers are outer rollers.

22. The speed change device of claim 21 in which the geared ring is in geared contact with each outer roller.

23. The speed change device of claim 1 in which the inner rollers are supported by a cage for fixed spacing.

24. The speed change device of claim 23 in which the inner rollers are supported by pins that are secured to the cage.

25. The speed change device of claim 1 in which the outer rollers are supported by a cage for fixed spacing.

26. The speed change device of claim 25 in which the outer rollers are supported by pins that are secured to the cage.

27. The speed change device of claim 1 comprising the free spinning ring, and the one or more geared rollers are in geared contact with the free spinning ring.

28. The speed change device of claim 27 in which the geared rollers are outer rollers.

29. The speed change device of claim 28 in which the geared input ring has an outer surface in geared contact with the geared rollers.

30. The speed change device of claim 28 in which the free spinning ring has an inner surface in geared contact with the geared rollers.

31. A speed change device comprising:
    an inner race having an outer surface;
    an outer race having an inner surface;
    a set of orbital rollers including inner rollers in rolling contact with the outer surface of the inner race and outer rollers in rolling contact with the inner surface of the outer race;
    each inner roller being in rolling contact with two outer rollers;
    in which each of the inner race and outer race are centered on an axis, and, for each pair of a first inner roller that contacts a first outer roller, where a traction angle ø is defined as the angle between a first line extending outward from the axis through a center of the first inner roller and a second line extending from the contact point of the first outer roller with the outer race and a contact point of the first inner roller with the inner race, and the first inner roller contacts the inner race with a first coefficient of friction cf1 and the first outer roller contacts the outer race with a second coefficient of friction cf2, cf1>tan(ø) and cf2>tan(ø); and a geared input ring concentric with the inner race and the outer race, the geared input ring being in geared contact with one or more geared rollers of the set of orbital rollers, the one or more geared rollers also being in geared contact with a free spinning ring or the one or more geared rollers being inner rollers and the rolling contact of the one or more geared rollers with the outer surface of the inner race being geared contact or the one or more geared rollers being outer rollers and the rolling contact of the one or more geared rollers with the inner surface of the outer race being geared contact.

32. The speed change device of claim 31 in which the inner rollers and the outer rollers are pressed together under a pre-load force within the races.

33. A speed change device comprising:
an inner race having an outer surface;
an outer race having an inner surface;
a set of orbital rollers including inner rollers in rolling contact with the outer surface of the inner race and outer rollers in rolling contact with the inner surface of the outer race, wherein the inner rollers and the outer rollers are pressed together under a pre-load force within the races;
each inner roller being in rolling contact with two outer rollers; and
either A or B or both, wherein:
A: each inner roller is formed of two or more axially aligned roller sections; and
B: each outer roller is formed of two or more axially aligned roller sections.

34. The speed change device of claim 33 in which the outer rollers are longer than the inner rollers and the outer rollers are geared rollers.

35. The speed change device of claim 33 in which the inner rollers are longer than the outer rollers and the inner rollers are geared rollers.

* * * * *